(12) United States Patent
Ogasawara et al.

(10) Patent No.: US 9,207,718 B2
(45) Date of Patent: Dec. 8, 2015

(54) PORTABLE ELECTRONIC DEVICE

(71) Applicant: Sony Computer Entertainment Inc., Tokyo (JP)

(72) Inventors: Shinichi Ogasawara, Yokohama (JP); Masayasu Ito, Chiba (JP); Hajime Ishihara, Ibazaki (JP); Nobutoshi Hamada, Tokyo (JP); Shuuichi Miyazaki, Chiba (JP)

(73) Assignees: SONY CORPORATION, Tokyo (JP); SONY COMPUTER ENTERTAINMENT INC., Tokyo (JP)

(*) Notice: Subject to any disclaimer, the term of this patent is extended or adjusted under 35 U.S.C. 154(b) by 0 days.

(21) Appl. No.: 14/162,936

(22) Filed: Jan. 24, 2014

(65) Prior Publication Data
US 2014/0139988 A1 May 22, 2014

Related U.S. Application Data

(60) Continuation of application No. 13/328,102, filed on Dec. 16, 2011, now Pat. No. 8,672,767, which is a division of application No. 10/573,533, filed as application No. PCT/JP2004/013689 on Sep. 17, 2004, now Pat. No. 8,105,169.

(30) Foreign Application Priority Data

Sep. 26, 2003 (JP) .................. 2003-334670
May 10, 2004 (JP) .................. 2004-140426

(51) Int. Cl.
*A63F 9/24* (2006.01)
*G06F 1/16* (2006.01)
*A63F 13/90* (2014.01)

(52) U.S. Cl.
CPC .............. *G06F 1/1656* (2013.01); *A63F 13/08* (2013.01); *G06F 1/166* (2013.01); *G06F 1/169* (2013.01);

(Continued)

(58) Field of Classification Search
CPC ....................................................... A63F 13/06
USPC ............................................................ 463/46
See application file for complete search history.

(56) References Cited

U.S. PATENT DOCUMENTS 4,969,647 A  11/1990 Mical et al.
5,625,286 A   4/1997 Kamiya
(Continued)

FOREIGN PATENT DOCUMENTS

CN  1154522  7/1997
CN  1217510  5/1999
(Continued)

OTHER PUBLICATIONS

International Preliminary Examination Report on Patentability and Written Opinion of the International Searching Authority dated Jul. 6, 2006, from corresponding International Application No. PCT/JP2004/013689.

(Continued)

*Primary Examiner* — Omkar Deodhar
(74) *Attorney, Agent, or Firm* — Katten Muchin Rosenman LLP

(57) ABSTRACT

A portable electronic device 100 includes a horizontally long casing, both ends of which are gripped by a user's both hands, respectively. The device further includes a LCD fit into the front face of the casing 10. Outwardly projecting bulges are respectively formed at both sides of the rear face of the casing where fingers of the user gripping the casing 10 placed. Since the fingers and palms are naturally flexed to fit to the dome-like bulges 42L, 42R, the portable electronic device 100 fits comfortably in the user's hands. The operability is hard to be degraded even if the device is vibrated strongly during a game play with the device.

5 Claims, 19 Drawing Sheets

(52) U.S. Cl.
CPC ............ *G06F 1/1624* (2013.01); *G06F 1/1626* (2013.01); *G06F 1/1688* (2013.01); *A63F 2300/204* (2013.01); *A63F 2300/206* (2013.01)

(56) References Cited

U.S. PATENT DOCUMENTS

| | | | |
|---|---|---|---|
| 5,685,776 | A | 11/1997 | Stambolic et al. |
| 6,102,802 | A * | 8/2000 | Armstrong ..................... 463/37 |
| 6,322,450 | B1 | 11/2001 | Nakano |
| 6,437,774 | B1 | 8/2002 | Tsuji et al. |
| 6,589,118 | B1 | 7/2003 | Soma et al. |
| 6,813,147 | B2 | 11/2004 | Jeong |
| 2001/0048586 | A1 | 12/2001 | Itou et al. |
| 2002/0047237 | A1 | 4/2002 | Oshita |
| 2003/0011973 | A1 | 1/2003 | Jeong |
| 2004/0224775 | A1 * | 11/2004 | Wood et al. ..................... 463/43 |

FOREIGN PATENT DOCUMENTS

| | | |
|---|---|---|
| CN | 1288393 | 3/2001 |
| EP | 0 978 302 | 2/2000 |
| EP | 1 058 177 | 12/2000 |
| GB | 2 231 701 | 11/1990 |
| JP | 7-88251 | 4/1995 |
| JP | 7-270457 | 10/1995 |
| JP | 8-137801 | 5/1996 |
| JP | 8-149587 | 6/1996 |
| JP | 9-153018 | 6/1997 |
| JP | 9-253332 | 9/1997 |
| JP | 11-110071 | 4/1999 |
| JP | 2000-116954 | 4/2000 |
| JP | 3330326 | 7/2000 |
| JP | 2000-301777 | 10/2000 |
| JP | 2000-342844 | 12/2000 |
| JP | 2001-22704 | 1/2001 |
| JP | 2001-29660 | 2/2001 |
| JP | 3077885 | 3/2001 |
| JP | 2001-104645 | 4/2001 |
| JP | 2001-337743 | 12/2001 |
| JP | 3087045 | 4/2002 |
| JP | 2002-151858 | 5/2002 |
| JP | 2003-84864 | 3/2003 |
| KR | 10-2003-0005827 | 1/2003 |
| WO | DM/46541 | 1/1999 |
| WO | DM/49073 | 8/1999 |

OTHER PUBLICATIONS

Notification of Reason(s) for Refusal dated Jan. 30, 2007, from corresponding Japanese Application No. 2005-514179.
Notification of Reason(s) for Refusal dated May 22, 2007, from corresponding Japanese Application No. 2005-514179.
Written Opinion and Search Report dated Jun. 21, 2007, from corresponding Singapore Application No. 200601921-0.
Supplementary Partial European Search Report dated Jul. 11, 2007, from corresponding European Application No. 04 77 3308.
European Communication pursuant to Article 94(3) EPC dated Mar. 17, 2008, from corresponding European Application No. 04 77 3308.
Chinese Office Action dated Aug. 1, 2008, from corresponding Chinese Application No. 200480030342.2.
Gekkan e Columbus, vol. 29, Toho Tsushinsha, Jun. 30, 2003, p. 69.
IGN, "PSP Specs Revealed" [Online], Jul. 29, 2003, XP002440120, http://ps2/ign/com/articles/430/430963p1.html.
International Search Report dated Dec. 28, 2004, from corresponding International Application No. PCT/JP2004/013689.
Australian Office Action dated Sep. 1, 2009, from corresponding Australian Application No. 2004306004.
Written Opinion and Search Report dated Feb. 4, 2010, from corresponding Singapore Application No. 200807113-6.
Fourth Office Action dated May 19, 2010, from corresponding Chinese Application No. 200480030342.2.
Notice of Preliminary Rejection dated Mar. 4, 2011, from corresponding Korean Application No. 10-2006-7005918.
Canadian Office Action dated Jul. 14, 2011, from corresponding Canadian Application No. 2,539,615.
United States Office Action dated May 5, 2008, from corresponding U.S. Appl. No. 10/573,533.
United States Office Action dated Jan. 14, 2009, from corresponding U.S. Appl. No. 10/573,533.
United States Advisory Action dated May 7, 2009, from corresponding U.S. Appl. No. 10/573,533.
United States Office Action dated Aug. 11, 2009, from corresponding U.S. Appl. No. 10/573,533.
United States Office Action dated Feb. 25, 2010, from corresponding U.S. Appl. No. 10/573,533.
Nintendo Gameboy Advance Instruction Booklet obtained from Nintendo.com on Sep. 19, 2002, <http://web.archive.org/web/20020919020634/http://www.nintendo.com/consumer/manuals/index.jsp>.
Korean Notice of Preliminary Rejection dated Jan. 20, 2012, from corresponding Korean Application No. 10-2006-7005918.
Chinese First Office Action dated Mar. 5, 2012, from corresponding Chinese Application No. 201110074474.7.
Chinese Second Office Action dated Oct. 29, 2012, from corresponding Chinese Application No. 201110074474.7.
Rejection Decision dated Jun. 5, 2013, from corresponding Chinese Application No. 201110074474.7.
United States Office Action dated Jul. 26, 2013, from corresponding U.S. Appl. No. 13/328,102.

* cited by examiner

PORTABLE ELECTRONIC DEVICE

TECHNICAL FIELD

The present invention relates to a structure of a portable electronic device, and in particular, to a structure for improving the operability of the portable electronic device.

BACKGROUND TECHNOLOGY

Recently various types of gaming products have been developed and they occupy a high position in entertainment field. In particular, portable gaming devices become popular recently and a user can enjoy playing games with the device anywhere.

DISCLOSURE OF THE INVENTION

Various types of portable electronic devices such as portable gaming devices and personal digital assistances (PDAs) are developed. Many of them have a casing taking shape similar to a rectangular solid. When a user plays a game with the portable electronic device, it is difficult for the user to grip the casing, and low operability of the device reduces interest in the game. There is another problem that the user's hands become fatigued easily when the user grips the casing of rectangular shape for a long time.

It is a general purpose of the invention to provide a portable electronic device having an easy-to-operate shape by a user.

One embodiment of the present invention relates to a portable electronic device comprising a horizontally long casing, both ends of which are capable of being gripped by a user's both hands, respectively, and a display unit fit into the casing, wherein outwardly projecting bulges are respectively formed at both sides of the rear face of the casing where fingers of the user gripping the casing placed.

According to the embodiment, since the fingers and a palm of a user are naturally flexed to fit to the dome-like bulges on the rear face of the casing, it is easy to grip the portable electronic device. And the operability is hard to be degraded even if the portable electronic device is vibrated strongly while a game is being played with the device. In addition, the portable electronic device fits comfortably in the user's hands. Therefore, even if the user grips the portable electronic device for a long time, the user feels hardly tired.

The casing of the portable electric device may be a resin molded part. The resin molded part comprises a transparent window through which the display unit can be viewed and a frame other than the transparent window. The transparent window is made of a first transparent resin. The frame is made from a second colored resin. The first resin and the second resin are preferably molded in a unified fashion by two-color molding. As such, by molding the transparent window and the frame in a unified fashion, strength of the casing may be ensured.

The first resin may be molded to cover whole surface of the frame in the resin molded part of the casing. Thus, uniform surface without a joint, a step, or a gap on the surface of the casing may be formed, which adds to the beauty.

The portable electronic device may comprise a speaker within the casing. A through hole may be formed at the bottom face of the casing for emitting sounds generated from the speaker. The through hole may be formed with an angle toward the front face of the casing. Thus, sounds are emitted toward the face of the user gripping the portable electronic device.

The portable electronic device may comprise a second through hole formed in the front face of the casing, and a duct formed inside the casing for directing sounds generated from the speaker to the second through hole. Thus, the user feels such that sounds are output from the front face of the casing. So, high realistic feeling is realized.

Any combination of elements stated above is also effective as one embodiment of the present invention.

According to the embodiments, the operability of a portable electronic device may be improved because of bulges are provided on a back face of a casing of the device.

BEST MODE FOR CARRYING OUT THE INVENTION

First Embodiment

Figure 1:
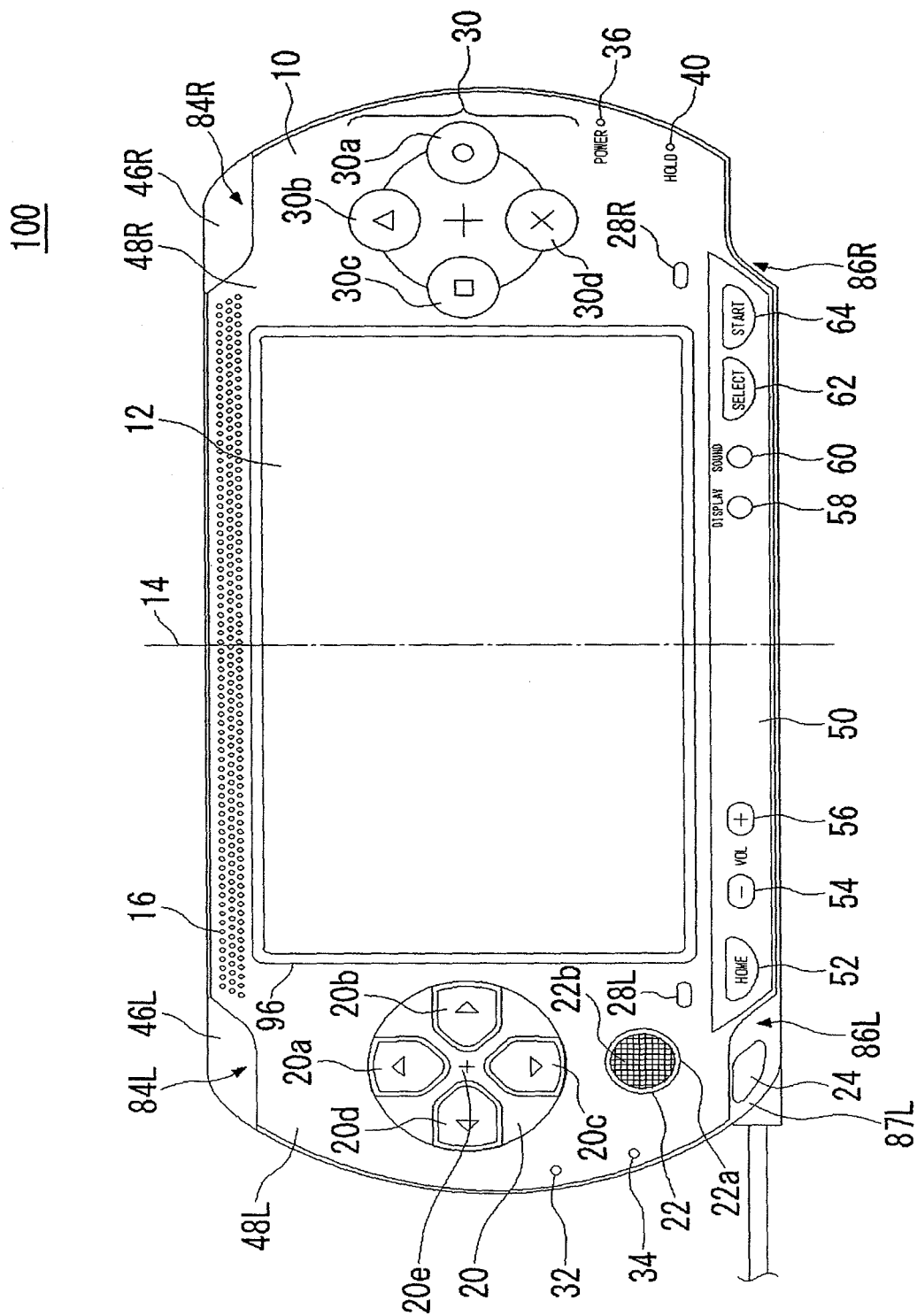
FIG. 1 is a front view of a portable electronic device according to first embodiment.

FIGS. 1 through 6 are views showing the appearance of a portable electronic device 100 according to one embodiment of the present invention. FIG. 1 is a front view of the portable electronic device 100. A casing 10 has a horizontally long oval shape as a whole. Each end of the casing 10 is formed in a circular curve shape with its center decentered from a center line 14 by a certain distance.

Figure 2:
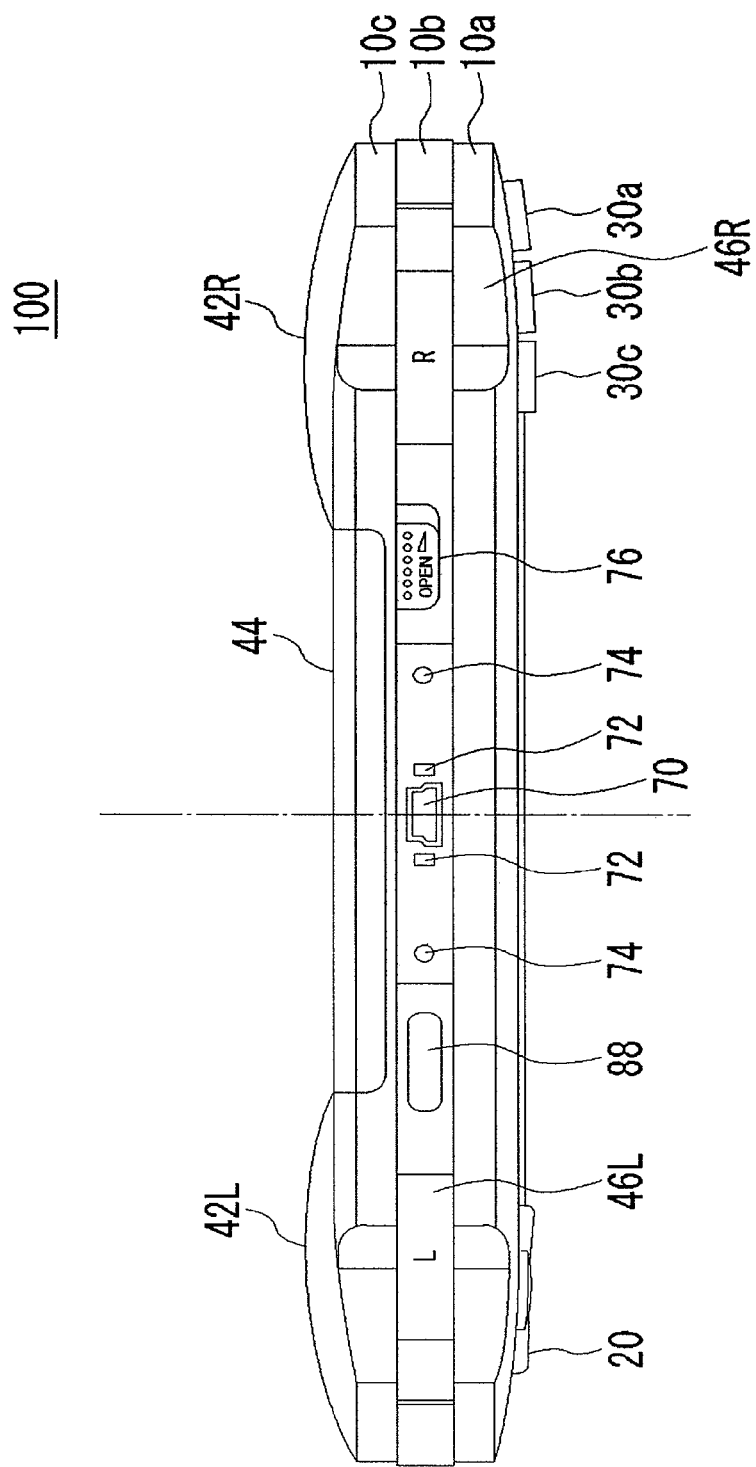
FIG. 2 is a top view of the portable electronic device according to first embodiment.
Figure 4:
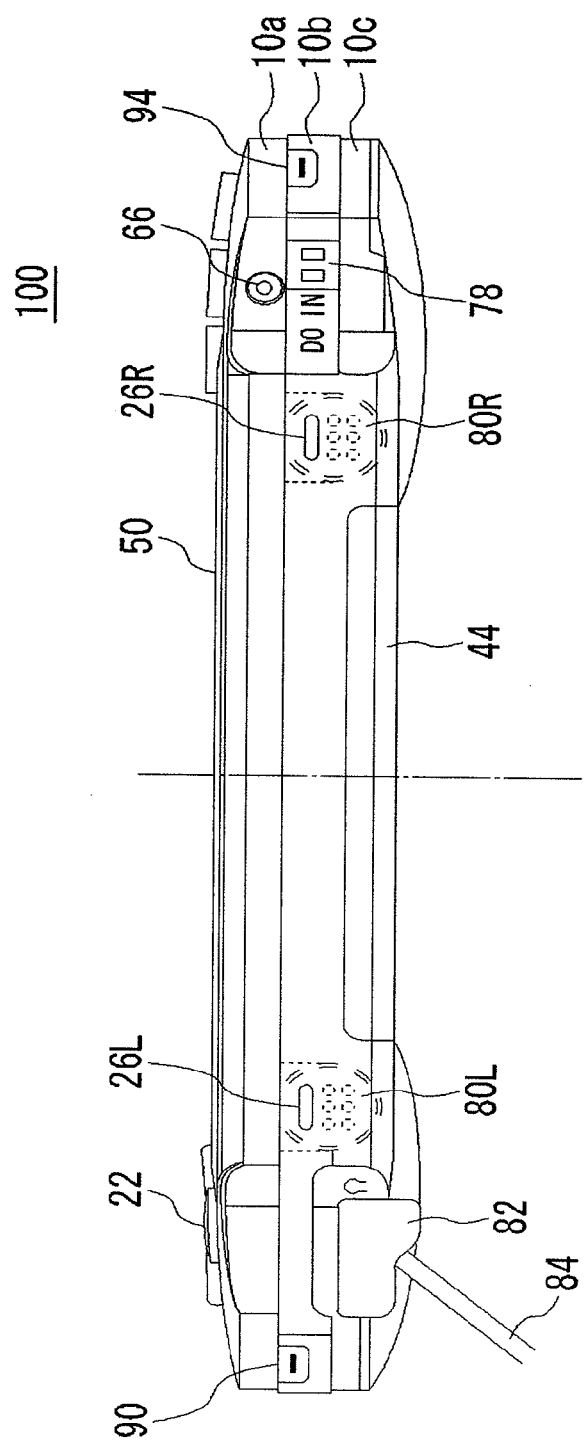
FIG. 4 is a bottom view of the portable electronic device according to first embodiment.

As shown in FIGS. 2 and 4, the casing 10 is composed of an upper part 10a, an intermediate part 10b, and a lower part 10c. Inside the casing 10, a circuit board (not shown) is provided. The circuit board includes: switch contacts for generating a signal by the operation of various corresponding buttons; a central processing unit which processes the signals so as to execute various computations; an image processing unit for executing image process; and a sound processing unit for executing sound process. The circuit board (not shown) is secured to the upper part 10*a* or the lower part 10*c*. The intermediate part 10*b* has a higher rigidity than those of the upper part 10*a* and the lower part 10*c* to ensure the rigidity of the entire casing 10.

Returning to FIG. 1, a liquid crystal display 12 (hereinafter, abbreviated as an "LCD 12") serving as a display device is fit into the center of the casing 10. The LCD 12 displays, for example, a game screen when the portable electronic device 100 functions as a game machine or displays a schedule or an address list when the portable electronic device 100 functions as a personal digital assistant (PDA).

Figure 7:
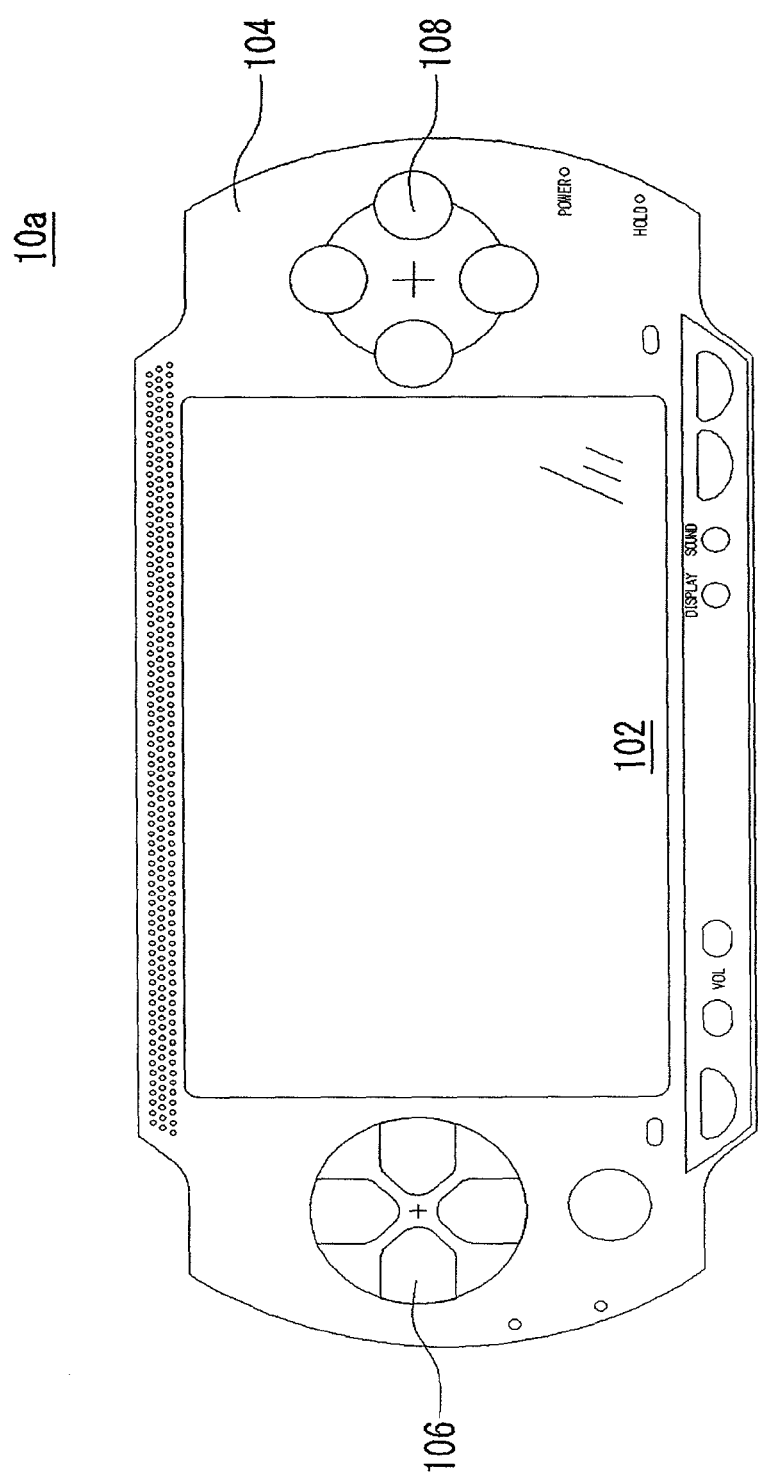
FIG. 7 shows a resin molded part for an upper part.
Figure 8:
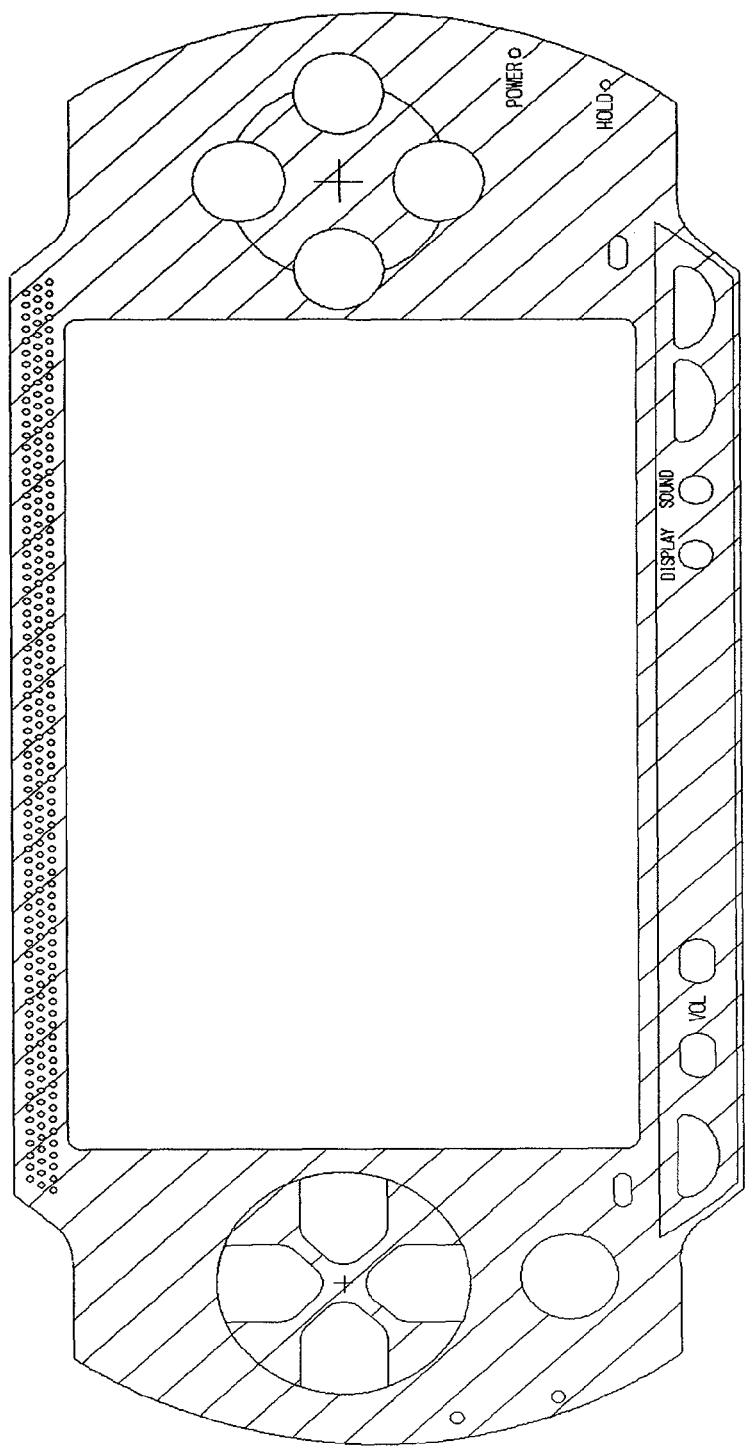
FIG. 8 shows a frame of the upper part.

FIG. 7 shows the shape of the upper part 10*a*. The upper part 10*a* is a resin molded part. The LCD 12 and various buttons mounted on the circuit board are covered by the upper part 10*a*. The upper part 10*a* comprises a transparent window 102 and a frame 104. FIG. 8 shows the frame 104. A substantially rectangular space for the transparent window 102 is formed in the frame 104. Holes 106, 108 where the various buttons are loosely inserted and holes for checking the LEDs therethrough are also formed in the frame 104.

The transparent window 102 is made of transparent resin material for protecting the LCD 12 and for enabling the LCD 12 being viewed through the window. The frame 104 is made of a colored resin material to conceal the circuit board from view. The transparent window 102 and the frame 104 are molded in a unified manner by two-color molding technology, which molds two resins of different colors or materials at the same time. More specifically, after injecting a colored resin material for forming the frame 104 into a mold form, a transparent resin material for forming the transparent window 102 is also injected into the mold form. At that time, the transparent material is molded to cover not only the transparent window 102 but the whole surface of the frame 104 (that is, the surface viewed by the user gripping the portable electronic device 100) except for the button holes like a thin film. Thus, uniform surface without a joint, a step, or a gap between the transparent window 102 and the frame 104 is formed, adding to the beauty and improving the visibility of the LCD 12 through the transparent window 102.

Regions of the frame 104 situated above and below the transparent window 102 (that is, a decorative area 16 and a button area 50), is very narrow as shown in FIGS. 7 and 8. Therefore, by performing the two-color molding, strength of the upper part 10*a* become improved when compared to the structure that a transparent sheet is attached onto the LCD for protection or the structure that transparent sheet is fit into the frame 104. Since the user sometimes pushes strongly the surface of the casing of the portable electronic device for button operation, the casing should have certain strength. By molding the transparent window and the frame in a unified manner according to the embodiment, strength can be ensured. In addition, since the transparent window 102 and the frame 104 can be molded in a unified manner at the same time, molding cost may be reduced. Further, by coating the whole surface of the frame 104 with a transparent resin material, surface with luster appearance may be acquired, which adds to the beauty.

As the resin materials, polycarbonate resin with shock resistance and transparency is preferable, but other resin such as acrylic may be employed. The transparent window and the frame may be molded in different resin materials from each other.

Returning to FIG. 1, the surface of the upper part 10*a* of the casing 10, that is, the front face being opposite to the user is mainly composed of: a left-hand area 48L gripped by the left hand of the user; a right-hand area 48R gripped by the right hand of the user; the LCD 12; a horizontally long button area 50 positioned below the LCD 12, where various buttons are provided; and a decorative area 16 positioned above the LCD 12. Notches 84L and 84R are formed on an upper left corner and an upper right corner of the upper part 10*a* of the casing 10, respectively.

In the left-hand area 48L, an arrow key 20 mainly for inputting a direction instruction and an analog device 22 mainly for analog input of the direction instruction are provided. The detailed structures and functions thereof will be described below. Indicators 32 and 34 are also provided in the left-hand area 48L. The indicator 32 lights up during access to a removable recording medium, and the indicator 34 lights up during wireless LAN (WLAN) communication.

The analog device 22 is located on the device closer to the user than the arrow key 20. The horizontal center of the analog device 22 is located closer toward the center line of the casing 10 than the horizontal center of the arrow key 20. The reason for this arrangement is as follows. When the left thumb of the user moves between the arrow key 20 and the analog device 22, the user pivotally moves his thumb with his palm on the lower left corner of the casing 10 as a supporting point. And the user tilts the center of the analog device 22 for operation. Therefore, the operation is facilitated when the analog device 22 is positioned closer to the center of the casing 10.

In the right-hand area 48R, buttons 30*a*, 30*b*, 30*c* and 30*d* (hereinafter, also collectively referred to as "button keys 30") are provided mainly for inputting a unique instruction. A structure and functions of the button keys 30 will be described below. Additionally, indicators 36 and 40 are provided in the right-hand area 48R. The indicator 36 lights up when the portable electronic device 100 is ON. The indicator 40 lights when the portable electronic device 100 is in a hold status where every key of the portable electronic device 100 is invalid.

As shown in FIG. 1, the center of the arrow key 20 and the center of the button keys 30 are preferably shifted upward in the vertical direction from the horizontal center line of the casing 10.

The center of the arrow key 20 and the center of the button keys 30 are preferably located at the same distance from the center line 14 of the casing 10 in the horizontal direction. Each distance between pressed faces 20*a*, 20*b*, 20*c* and 20*d* on a disk-like key top of the arrow key 20 is preferably set smaller than that between the buttons 30*a*, 30*b*, 30*c* and 30*d*. The reason for this arrangement is as follows. Since the arrow key 20 is mainly used to direct the vertical and horizontal movements, the user often keeps operating the arrow key 20. Therefore, it is preferable to set the distances between the pressed faces 20*a*, 20*b*, 20*c* and 20*d* of the key top so that the user can operate the arrow key 20 without taking his thumb off the pressed faces of the arrow key 20. On the other hand, the button keys 30 are often used to give different instructions by respective buttons 30*a*, 30*b*, 30*c* and 30*d*. Therefore, it is easier for the user to operate taking his thumb off the button keys 30. Hence it is preferable that the buttons 30*a*, 30*b*, 30*c* and 30*d* are located with a certain distance so as to avoid pressing unintended button with a tip of the thumb when the user places his/her thumb on one button.

At both ends of the transparent window 102 of the upper part 10*a*, a front-face through hole 28L is provided in the left-hand area 48L, and a front-face through hole 28R is provided in the right-hand area 48R.

The button area 50 is located in the vicinity of an outer edge of the upper part 10a of the casing 10 on the side closer to the user holding the portable electronic device 100. In the button area 50, buttons 52 to 64 are located other than the arrow key 20, analog device 22 and button keys 30. Preferably, the button area 50 is constituted so as to be visually distinct from the left-hand area 48L and the right-hand area 48R. In this embodiment, the button area 50 is formed in a horizontally extending elongated hill-like shape. The button area 50 is elevated above the level of the plane formed by the left-hand area 48L, the right-hand area 48R and the LCD 12. In the vicinity of the top of the hill, various buttons 52 to 64 are provided. With this arrangement, the user can visually distinguish the buttons to be operated during gameplay or an application operation from the other buttons. Furthermore, since the button area 50 is elevated, the user can be tactilely aware of the arrangement of these buttons 52 to 64. The elevated shape of the button area 50 also serves to protect the LCD 12.

The structure of the button area 50 is not limited to the above-described structure. Any structure may be employed as long as the height of the button area 50 differs from the height of the left-hand area 48L and the right-hand area 48R. Herein, the "height" means a height based on a horizontal plane, on which the casing 10 is placed so that the upper part 10a is oriented upward. For example, an elongated step having a trapezoidal or rectangular cross section may be provided to arrange the various buttons 52 to 64 thereon. Alternatively, walls having the height equal to or greater than height of top of the buttons 52 to 64 may be provided above and below the buttons 52 to 64 arranged on the same plane with the left-hand area 48L, the right-hand area 48R and the LCD 12. With these walls, the buttons 52 to 64 are not easily pressed down by the user's hands operating the arrow key 20 or the button keys 30.

It is preferable that the buttons 52 to 64 (also referred to as "sub operation buttons") arranged in the button area 50 are not frequently used for gameplay or a main operation of the other applications, and therefore the buttons 52 to 64 are not required to be frequently pressed. Specifically, a home button 52 is used to go 12 back to a main screen. A volume buttons 54, 56 serve to decrease/increase the volume of a sound reproduced through a speaker or a headphone, respectively. A display button 58 turns ON/OFF a backlight of the LCD 12. A sound button 60 turns ON/OFF a sound output. A select button 62 serves for selecting one item from items displayed on the LCD 12. A start button 64 mainly serves to start a game when a game program is being executed.

In a conventional portable electronic device or game controller, buttons stated above are not provided on the plane different from the plane with the arrow key or the button keys as this embodiment, but provided below the arrow key or the button keys, for example. With such conventional arrangement, when the user operates the arrow key or the button keys, the finger of the user carelessly touches such buttons, sometimes leading to an erroneous operation. On the other hand, according to this embodiment, since the various buttons are arranged on the plane distant from the arrow key or the button keys, erroneous operations are reduced.

Notches 86L and 86R are also formed on the lower left corner and the lower right corner of the upper part 10a of the casing 10 as on the upper left corner and the upper right corner. Below the notches 86L, grip parts 87L are provided. A hole 24 is formed in the grip part 87L to allow a strap (not shown) or the like to be passed therethrough and tied.

When the portable electronic device 100 according to this embodiment is used, the forefingers are placed on the top side face of the casing 10 so that the left thumb is placed above the arrow key 20 or the analog device 22 and the right thumb is placed above the button keys 30, as described with reference to FIG. 9. The other fingers are placed so as to cover dome-like bulges on the rear face of the casing 10. In this manner, the curve formed by the forefingers fits to the shape of the left and right side faces of the casing to help the user's grip. At the same time, the weight of the casing 10 is kept by the middle fingers to the little fingers. Therefore, even if the thumb or the forefinger is moved for operation, the remaining fingers can stably support the portable electronic device 100.

FIG. 2 is a top view of the portable electronic device 100. As described above, dome-like bulges 42L and 42R (hereinafter, also collectively referred to as "bulges 42") are formed on both ends of the rear face of the casing 10. A plane is formed between the two bulges 42. Almost the entire plane is a lid 44 of a small disk drive unit. One end of the lid 44 is pivotally supported to the lower part 10c of the casing. By sliding a switch 76 provided in the intermediate part 10b, another end of the lid 44 opens backward of the portable electronic device 100. A small disk drive unit (not shown) is housed in the casing under the open lid 44. A small disk can be loaded on the disk drive unit. The small disk provides an application program or a game program for the portable electronic device 100. Most of mechanical parts of the small disk drive unit such as optical pick-up (for example, a lens and servo system) are positioned under the right half part of the LCD 12 in FIG. 1.

An L-button 46L and an R-button 46R (hereinafter, also collectively referred to as "LR-buttons 46") are buttons respectively operated by the left forefinger or left middle finger and the right forefinger or right middle finger of the user. The LR-buttons 46 are preferably used for giving a special instruction that cannot be commanded only with the arrow key 20 or the button keys 30. For example, when a game screen is displayed on the LCD 12, the LR-buttons 46 may be operated for a special action of a character in the game (for example, a fighting stance or a squatting position), firing a special weapon and the like.

By providing the dome-like bulges 42 for grip on the rear face of the casing 10, the fingertip of the user is unlikely to touch the lid 44 of the small disk drive unit, preventing a large force from being applied to the disk drive unit. Furthermore, the dome-like bulges 42 are provided on both ends of the rear face of the casing 10. Therefore, even if the portable electronic device 100 is placed on a plane, the lid 44 of the small disk drive unit does not come into contact with the plane. Further, since the impact to the small disk drive unit become smaller, stable operation of the disk drive unit is ensured, leading to decrease read errors.

As can be seen from FIG. 2, the tops of the arrow key 20 and the button keys 30 are higher than the maximum height of the transparent window 102 of the upper part 10a when the casing 10 is placed on a horizontal plane so that the face without the LCD 12 is oriented downward. Therefore, even if the casing 10 is placed so that the face with the LCD 12 is oriented downward, surface of the transparent window 102 over the LCD 12 is not worn. Furthermore, as shown in FIG. 2, the casing 10 has a circular curve cross section so that its thickness decreases from its center toward both ends. The arrow key 20 and the button keys 30 are arranged so as to be inclined toward the ends of the casing 10 in accordance with the cross-sectional shape of the casing 10. This arrangement helps the user to grip the casing 10 and improves the operability of the arrow key 20 and the button keys 30.

In the intermediate part 10b of the casing 10, an input terminal 70 for an external device and attachment holes 74 for fixing the external device to the casing 10 are provided. Using the input terminal 70 for connection with the external device, the portable electronic device 100 can be used as an input device for a personal computer or the like in place of a keyboard or a mouse, for example. Connection with the external device will be further described later in detail. A switch 76 for opening the cover of the small disk drive unit and an infrared port 88 for infrared communication module are also provided in the intermediate part 10b.

Figure 3:
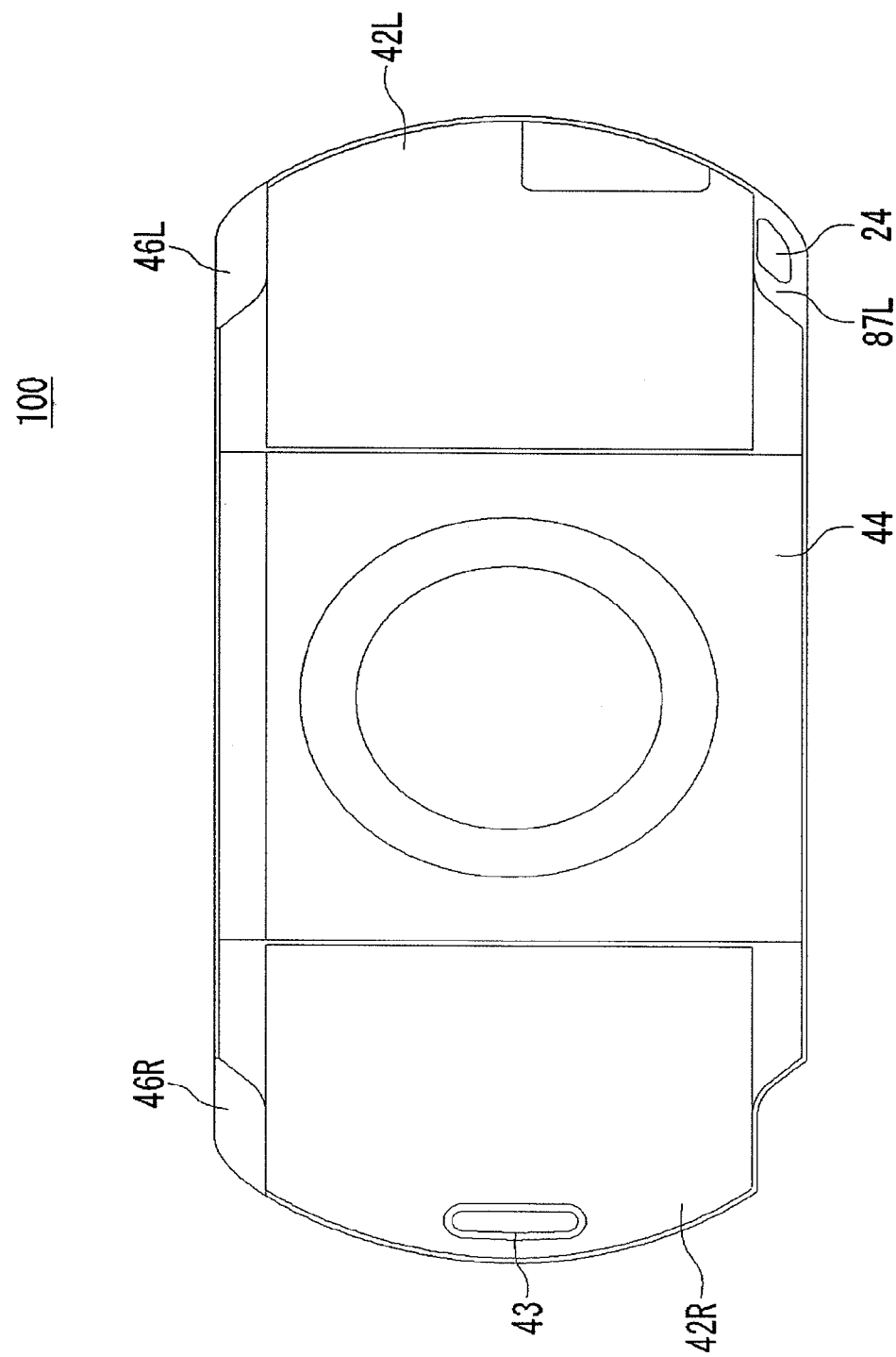
FIG. 3 is a rear view of the portable electronic device according to first embodiment.

FIG. 3 is a rear view of the portable electronic device 100. As described above, the dome-like bulges 42R and 42L are provided on the both ends of the rear face of the portable electronic device 100. Between the bulges 42R and 42L, the lid 44 of the small disk drive is provided. The dome-like bulge 42R also serves as a lid for a battery box (not shown). By pressing down an oblong projection 43 and sliding the bulge 42R leftward (direction to the end of the portable electronic device 100), the bulge 42R is detached from the casing and replaceable battery in the casing shows up.

FIG. 4 is a bottom view of the portable electronic device 100. As indicated with a dotted line in FIG. 4, speakers 80L and 80R are provided in the casing 10. In front of the speakers 80L, 80R, bottom-face through holes 26L, 26R are formed on the intermediate part 10b, respectively. A plug 82 for a code 84 connected to a headphone or a remote controller is inserted into jacks. The jacks will be described later with reference to FIG. 12. On the right of the upper part 10a, a terminal 66 for supplying DC power to the portable electronic device 100 is provided. On the right of the intermediate part 10b, electrodes 78 are provided for supplying electric power from a so-called "cradle" to the portable electronic device 100 when the portable electronic device 100 is placed on the cradle. Projections of the cradle are inserted into the bottom-face through holes 26L, 26R for supporting the portable electronic device 100 when the device 100 is placed on the cradle.

Figure 5:
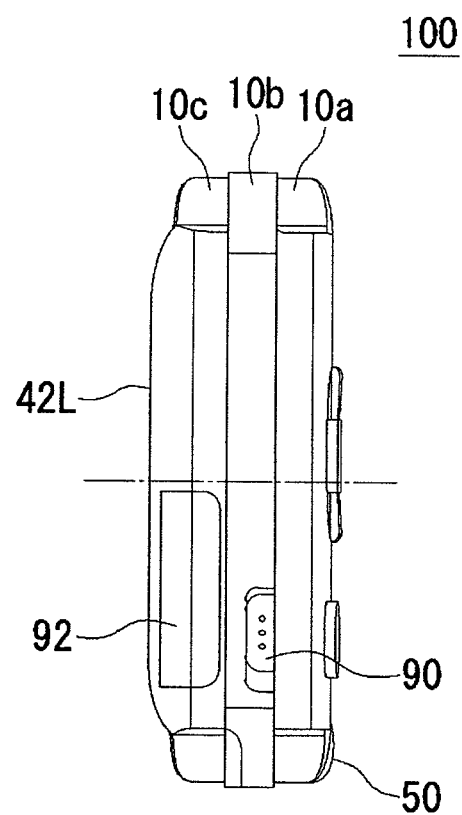
FIG. 5 is a left side view of the portable electronic device according to first embodiment.
Figure 6:
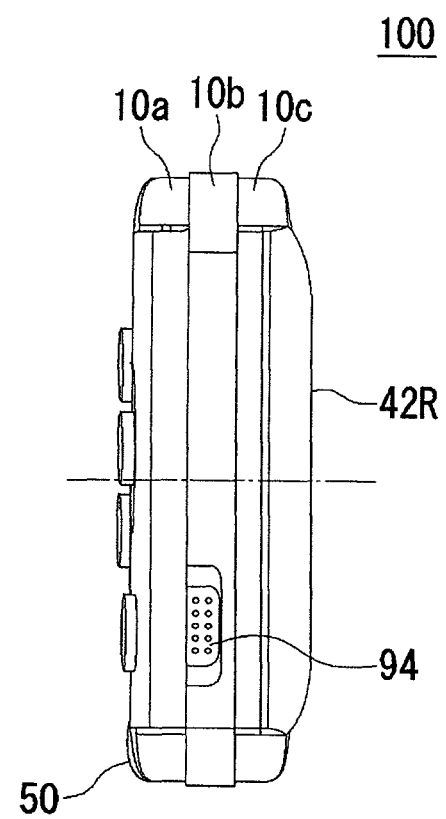
FIG. 6 is a right side view of the portable electronic device according to first embodiment.

FIG. 5 is a left side view of the portable electronic device 100. A WLAN switch 90 is provided in the intermediate part 10b, and an insert slot 92 for receiving a removable recording medium is provided in the lower part 10c. FIG. 6 is a right side view of the portable electronic device 100. A power switch 94 for switching ON/OFF the portable electronic device 100 is provided in the intermediate part 10b.

Figure 9:
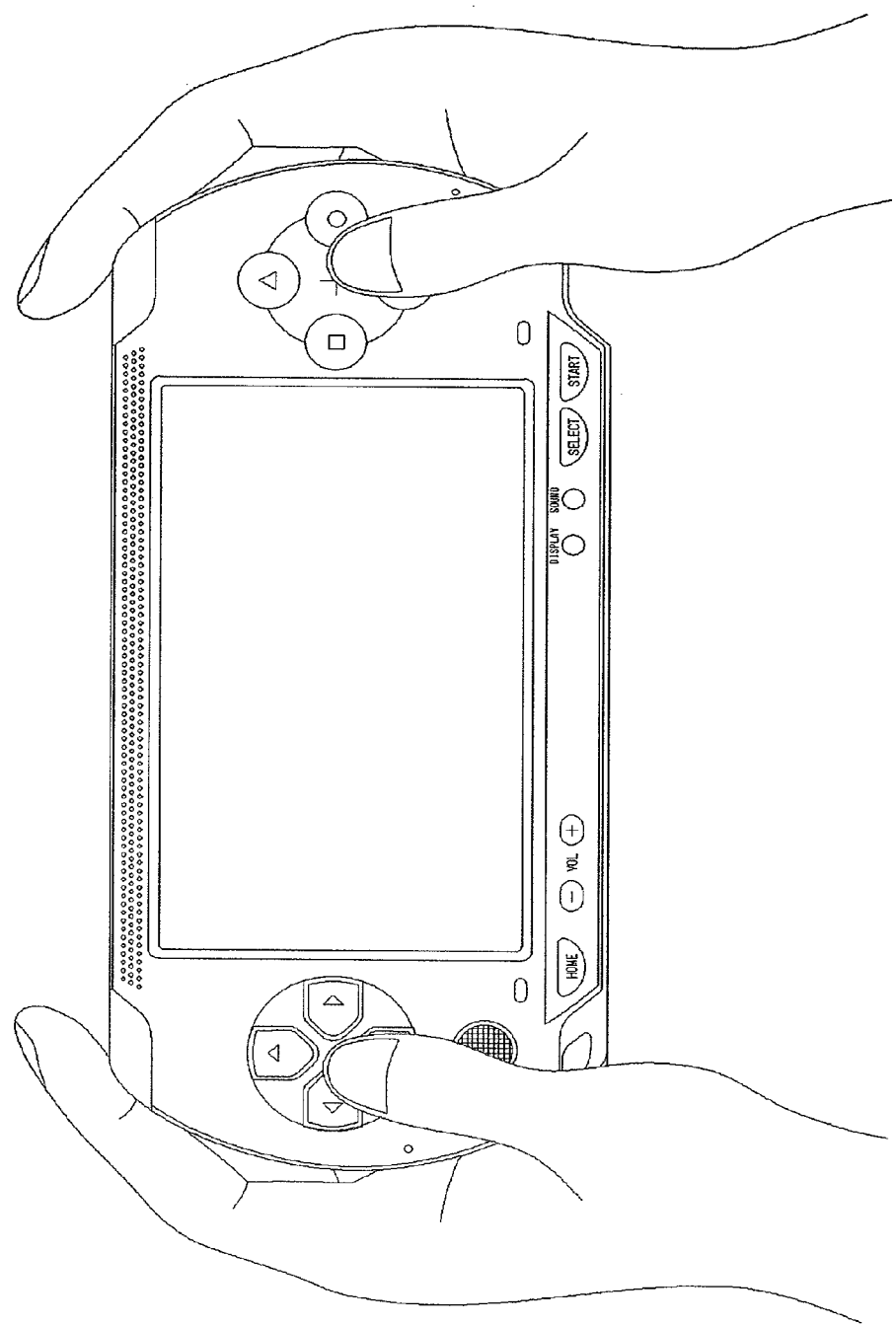
FIG. 9 is a view showing how the portable electronic device is gripped by both hands of the user.

FIG. 9 is a view showing how the portable electronic device 100 is gripped by the user. The portable electronic device 100 is basically operated while being held by the user's both hands. The right and left ends of the casing 10 are held by the right and left hands, respectively. As shown, the user's left hand is slightly flexed to hold the casing 10 along the arc shape of the left side face of the casing 10. At this time, the left thumb of the user is placed on the arrow key 20 to operate the arrow key 20. Similarly, the user's right hand is also slightly flexed to hold the casing 10 along the arc shape of the right side face of the casing 10. The right thumb of the user is placed on the center of the button keys 30 to operate the button keys 30. Only the user's forefingers or forefingers and middle fingers are slightly flexed and are placed on the LR-buttons 46. The LR-buttons 46 are operated by the forefingers or middle fingers.

The user's middle finger, ring finger and little finger, or ring finger and little finger are put on the rear face of the casing 10 while being slightly flexed to support the weight of the portable electronic device 100. As described above, the dome-like bulges 42 are provided at both ends of the rear face of the casing 10 so as to fit to the curve of the user's fingers. For example, the dome-like bulges 42 are made of a plastic material. A slip-resistant material such as a rubber or a metal material for texture may be used. Each of the dome-like bulges 42 has a smooth arc cross section as shown in FIG. 2 or FIG. 4. Alternatively, steps may be put on the bulges 42 for receiving the user's fingers, or a plurality of small protrusions may be formed on its surface to improve the resistance against slip. The bulges 42 make it easier to grip the portable electronic device 100. Therefore, even if the device 100 is vibrated strongly by the user while a game is being played with the device, the operability is hard to be degraded. Moreover, since the fingers and a palm are naturally flexed to fit to the arc shape of both ends of the casing 10 and to the dome-like bulges 42 on the rear face of the casing 10, the portable electronic device 100 fits comfortably in the user's hands. Therefore, even if the user grips the portable electronic device 100 for a long time, the user feels hardly tired. Furthermore, since the weight of the portable electronic device 100 is supported by the middle fingers, ring fingers and little fingers, the portable electronic device 100 can be stably held even when the user releases his thumb or forefinger off the buttons.

Figure 10:
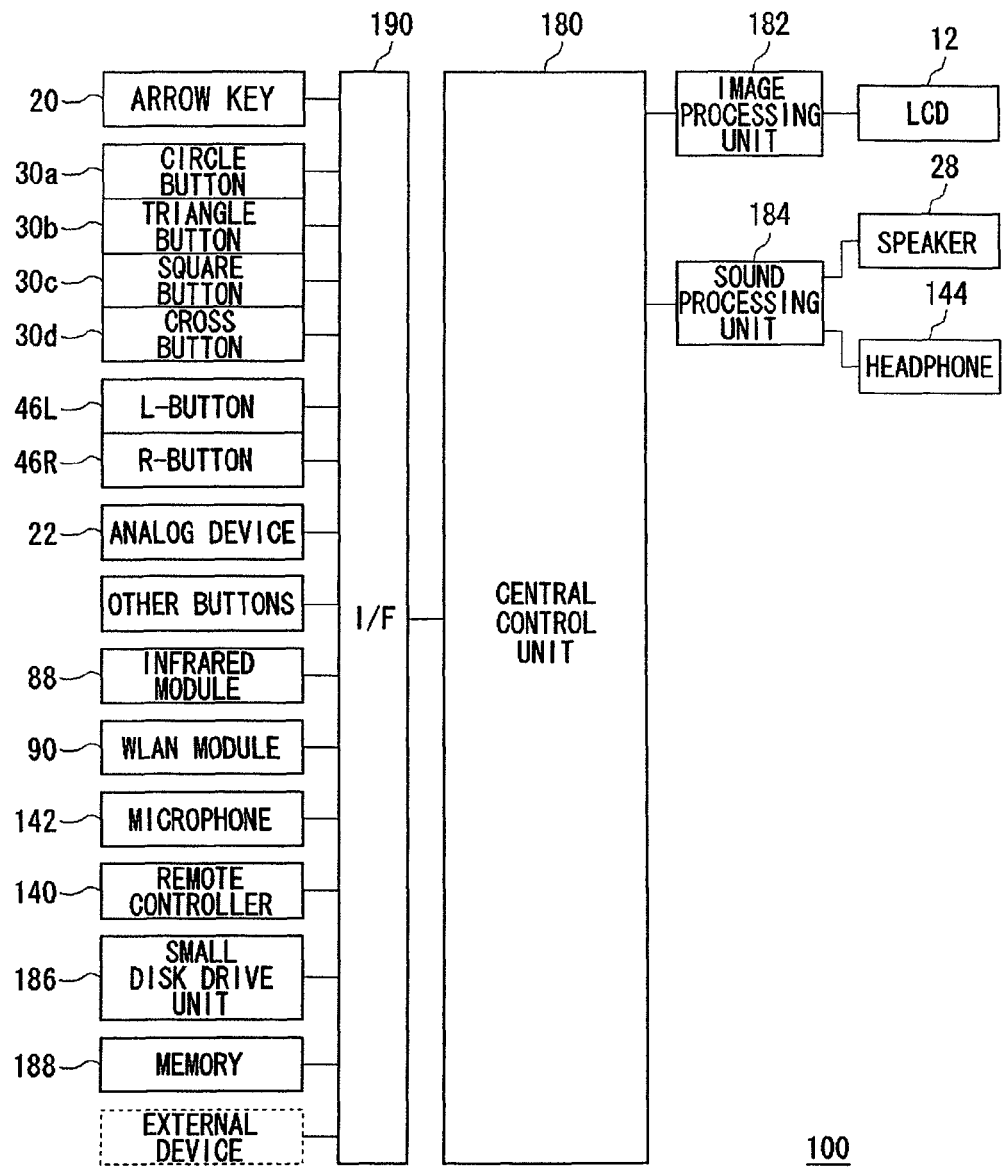
FIG. 10 is a functional block diagram of the portable electronic device.

FIG. 10 is a functional block diagram of the portable electronic device 100. When the arrow key 20, the buttons 30a, 30b, 30c, 30d, the L-button 46L, and the R-button 46R are pushed down, a digital signal in response to the push operation is input to the central processing unit 180 via interface (shown as "I/F 190" in FIG. 10). Other buttons not shown in FIG. 10 are same. When the user takes his/her finger off the button, the button comes back to its original position. Operation of the analog device 22 is converted into a digital signal, and input to the central processing unit 180 via I/F 190. Input signals into the infrared module 88 and the WLAN module 90 is input to the central processing unit 180 via I/F 190. Sound input to the microphone 142 is converted into a digital signal, and is input to the central processing unit 180. When the remote controller 140 is operated, a digital signal depending on the operation is input to the central processing unit 180 via I/F 190. The small disk drive unit 186 and memory 188 is connected to the central processing unit 180. The central processing unit 180 processes various input signals with application software program recorded on the disk loaded on the small disk drive unit 186 or stored in the memory 188, and outputs image signals and audio signals as a result of the process. The image processing unit 182 treats output image signals to display images on the LCD 12. The sound processing unit 184 treats output audio signals to make sounds over the speakers 28 or the headphone 144.

The portable electronic device 100 has a plurality of functions. As an example, the portable electronic device 100 functions as a game machine. The user inserts a disk storing a game program therein onto the small disk drive unit 186 provided on the rear face of the casing 10 to play a game. More specifically, when the power switch 94 is turned ON after loading the disk, the game program is read out from the small disk to display a start screen on the LCD 12. When the start button 64 is pressed in this state, the game starts. When the user operates the arrow key 20, the analog device 22, or the button keys 30 to select menu items or to operate a character displayed on the screen, the input signal is transmitted to a central processing unit 180. The central processing unit 180 makes the game progress in accordance with the input signals and the game program.

In another example, the portable electronic device 100 also functions as a music player. The user loads a disk storing music data therein onto the small disk drive unit 186 or inserts a removable recording medium into the slot 92 to listen to recorded music. In this case, the user uses the arrow key 20 or the analog device 22 to select a title of the song from the titles displayed on the LCD 12 which the user would like to listen to. The selected music data is converted into analog sounds by a sound processing unit 184 to be output from speakers 28 or a headphone 144.

The functions of the portable electronic device 100 are not limited thereto. The portable electronic device 100 may have functions such as an address list, a schedule, a memo pad, an E-mail communication, and the like as is the case of a conventional personal digital assistant (PDA).

The overall configuration of the portable electronic device 100 according to this embodiment has been described above. Next, the configuration and the function of each main component will be described in detail.

1. Arrow Key

The arrow key 20 gives a discrete direction instruction for eight directions, that is, up, down, right and left, plus four directions between them. As shown in FIG. 1, the arrow key 20 comprises the convex pressed faces 20*a*, 20*b*, 20*c* and 20*d* corresponding to four directions (up, down, right, and left) on the surface of the disk-like key top. The disk-like key top is tiltably supported by a supporting point 20*e* at the center of the key top, which is able to tilt in the eight directions. A deformation member, a conductive member, and a switch contacts are provided below each of the pressed faces 20*a*, 20*b*, 20*c* and 20*d*. When any one of the pressed faces 20*a*, 20*b*, 20*c* and 20*d* of the arrow key is pressed down, only the switch contacts below the pressed convex face is turned ON. The arrow key 20 is used to move a character in the vertical and horizontal directions in the game or to select an item from those listed in the menu screen. Since each of the pressed faces 20*a*, 20*b*, 20*c* and 20*d* of the arrow key 20 is formed in a convex shape, the user can perform a desired operation without directly viewing the arrow key 20. Since the top of the convex faces is formed to be higher than the maximum height of the transparent window 102 of the upper part 10*a*, the surface of the transparent window 102 over the LCD 12 can be protected from wearing even when the casing 10 is placed as the LCD 12 is oriented downward. Moreover, since the disk-like key top is slant toward its center in a cone shape, it is easy to put the thumb on the center to ensure the operation of the arrow key 20.

2. Analog Device

The analog device 22 is used to continuously give a direction instruction in 360 degrees. The analog device 22 includes a hole 22*a* formed in the front face of the casing 10, an operation pad 22*b*, and detection means (not shown). The operation pad 22*b* passes through the hole 22*a* and is constructed to be longitudinally and horizontally movable in the hole 22*a*. The operation pad 22*b* is made of, for example, a rubber. The detection means converts the amount of movement and the direction of movement of the operation pad 22*b* into an electric signal.

The operation pad 22*b* of the analog device 22 is biased toward the center of the hole 22*a* by a spring or the like. When the user does not operate the operation pad 22*b*, the operation pad 22*b* is positioned in the center of the hole 22*a*. In operation, the user can tilt the operation pad 22*b* in 360 degrees. Since the stroke of the tilting is set to about 2 mm, the user can tilt the operation pad 22*b* for minute input to great input.

With such a structure, the portable electronic device 100 according to the embodiment can realize the game controller with same functions as those of a so-called "joystick" and have high operability in spite of its small size.

The input transmitted by the detection means as an electronic signal is converted into a digital signal by an analog/digital converter provided on the circuit board (not shown), which is then transmitted to the central processing unit 180. The central processing unit 180 performs a computation based on the program to display images on the LCD 12 in accordance with the user's input.

The input from the arrow key 20 and the input from the analog device 22 may be easily switched by the software process. Alternatively, an analog switch for switching the input between the arrow key 20 and the analog device 22 may be provided on the portable electronic device 100.

3. Button Keys

As shown in FIG. 1, the button keys 30 are composed of the buttons 30*a*, 30*b*, 30*c* and 30*d*. On the surfaces of cylindrical key tops of the buttons 30*a*, 30*b*, 30*c* and 30*d*, circle, triangle, square, and cross signs are printed, respectively. These buttons 30*a*, 30*b*, 30*c* and 30*d* are used to input a single instruction. The deformation member, the conductive member, and the switch contacts described above are provided below each of the buttons 30*a*, 30*b*, 30*c* and 30*d*. When any one of the buttons 30*a*, 30*b*, 30*c* and 30*d* is pressed down, only the switch contact just below the pressed button is turned ON. The correlation between the type of input and each button key differs depending on the type of the game program or the application running on the portable electronic device 100. For example, the buttons keys are used for input such as an attack in a game, item acquisition, menu screen display, item selection, or response to inquiry.

Each button key is arranged with predetermined spacing between the button keys so as to be placed at the four apexes of the square, as shown in FIG. 1. Therefore, if the user extends the right thumb, the user can operate the triangle button and the square button on the far side when viewed from the right hand side without changing the gripping position of the casing 10. When the right thumb is flexed, the user can operate the circle button and the cross button on the close side when viewed from the right hand side. For identification of each of the buttons, protrusions or grooves and the like corresponding to circle, cross, triangle, and square signs may be provided on the surfaces of the buttons.

4. LR-Keys

Recent video games require complicated operation. So, operation means sometimes would be short only with the arrow key and the button keys. Therefore, many controllers provide the L-button and R-button so as to increase the number of operation means. In the portable electronic device 100 according to this embodiment, the LR-buttons 46 are provided on the top side face of the intermediate part 10*b* of the casing 10 as shown in FIGS. 1 and 2. The LR-buttons are press-type buttons. When the LR-buttons 46 are not pressed, the LR-buttons 46 exhibit such appearance that the LR-buttons 46 constitute a part of the intermediate part 10*b*. Moreover, as described above, the LR-buttons 46 are provided at the positions that the fingertips of the forefingers touch when the user grips the casing 10.

By the way, when a game creator conceives the game contents, he/she must take the operability of a controller into account. In this sense, the functions of the controller and the game contents are in close relation with each other. In other words, the game contents are often restricted by the functions or the operability of the controller. The portable electronic device according to this embodiment has the operation buttons including the arrow key, the analog device, the button keys, and the LR-buttons, which are equivalent to or superior to the functions of the controller of a stay-at-home type game machine although its size is compact. Since a conventional portable game machine is not equipped with various operation buttons, the feasible game contents are restricted or a game program is required to be changed when some stay-at-home type game is ported to the portable game machine. In the portable electronic device according to this embodiment, however, such problems do not arise. Thus, the sphere of creation by game creators can be expanded.

Operating means such as the arrow key, the button keys, or the LR-keys function as man-machine interface between the user and the portable electronic device, which is very important for the user during a game play. In other words, the operability of the casing or the functionality of the operating means of the portable electronic device is very linked to easy-to-play gaming and the fun of gaming. According to the embodiment, the portable electronic device can be provided having high operability and high extensibility in spite of its size capable of being gripped by both hands of the user.

5. Speakers

The portable electronic device 100 can output sounds from the front-face through holes 28L, 28R on the front face of the casing 10 and from the bottom-face through holes 26L, 26R on the bottom face of the casing 10.

As shown in FIG. 4, the speakers 80L, 80R outputting sounds are provided one by one on either side near the bottom face of the casing 10. The speakers 80L, 80R are placed substantially perpendicular to the bottom face of the casing 10. The speakers 80L, 80R are placed for outputting sounds to bottom direction of the casing 10. The bottom-face through holes 26L, 26R are placed in front of the speakers 80L, 80R in the intermediate part 10b. Sounds from the speakers 80L, 80R are emitted outside of the casing 10 through the bottom-face through holes 26L, 26R. The bottom-face through holes 26L, 26R are formed with an upper angle toward the front face of the casing 10 such that sounds come toward the face of the user gripping the portable electronic device 100.

Figure 11:
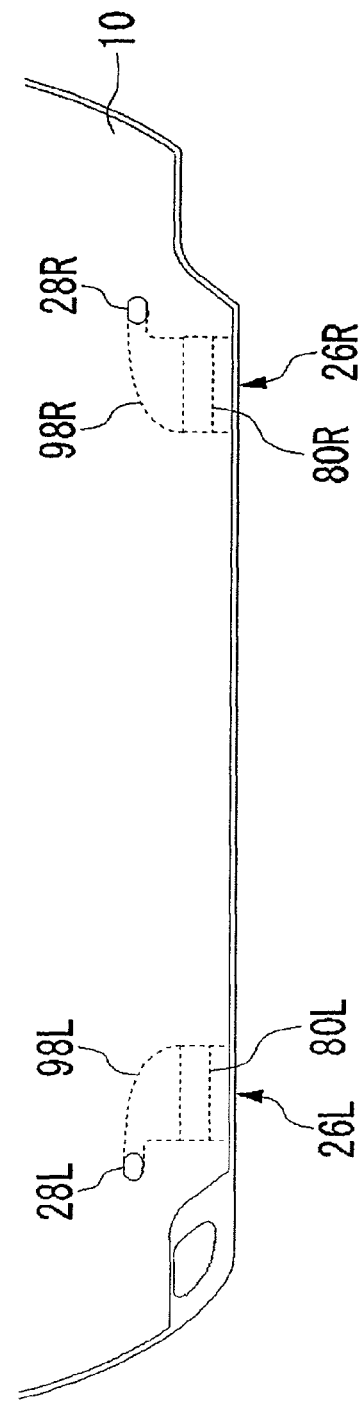
FIG. 11 shows structure of speakers.

As shown in FIG. 11, ducts 98L, 98R are formed inside the casing 10 having a route from backside of the speakers 80L, 80R to the front-face through holes 28L, 28R. With these ducts, part of sounds output from the speakers 80L, 80R is emitted toward the face of the user gripping the casing 10. Thus, the user feels such that sounds are output from the front face of the casing 10. So, high realistic feeling is realized. These ducts may be designed as so-called bus reflex structure for emphasizing bass sounds.

Since sounds are emitted to two different directions from four through holes on the front face and the bottom face of the casing 10, the realistic feeling may be improved. By these four through holes, sounds with surrounding effect may be output from the portable electronic device 100.

6. Headphones

Figure 12:
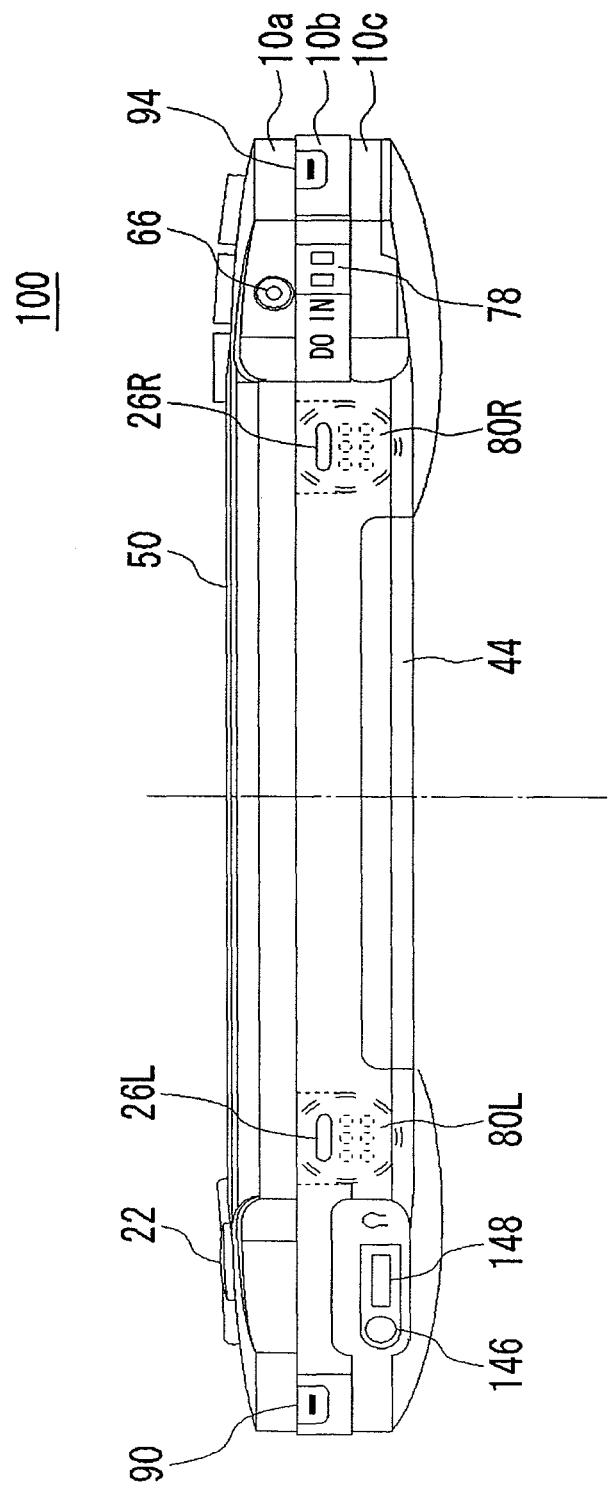
FIG. 12 shows a headphone jack and a remote controller jack.

FIG. 12 shows the casing 10 with plug 82 of a headphone (not shown) detached from jacks. A circular jack 146 is a jack for outputting sounds to the headphone and a rectangular jack 148 is a jack for inputting from a remote controller (not shown) and a microphone (not shown). The plug 82 has two different shaped terminals for being inserted to the jack 146 and 148, respectively.

7. Input Terminal and Power Terminal

As mentioned above, the input terminal 70 for external device and attachment holes 74 for fixing the external device to the casing 10. The portable electronic device 100 according to the embodiment may be used instead of, for example, an existing keyboard or a mouse as inputting device to a personal computer or so by using the input terminal 70 to be connected to the external device.

In some cases, the input terminal 70 cannot supply power to the external device from the portable electronic device 100. When external device such as a camera is attached to the portable electronic device 100 for receiving data input from the external device, power terminals 72 may be provided on either side of the input terminal 70 for supplying power to the external device from the portable electronic device 100.

The external device may include a camera unit or a GPS unit. With a camera unit, the portable electronic device 100 may be used as general digital camera. In addition, the portable electronic device 100 may be used as a game screen by displaying the face of the user gripping the portable electronic device 100 on the LCD 12. Further, the portable electronic device 100 may be used for recognizing the user's bodily movement shot by the camera as game input. With the GPS unit, the portable electronic device 100 may be used as handheld-type GPS locator for providing location guidance or record of user's movement history to the user. In addition, a keyboard or a cellular phone module can be connected to the input terminal 70.

Second Embodiment

Figure 13:
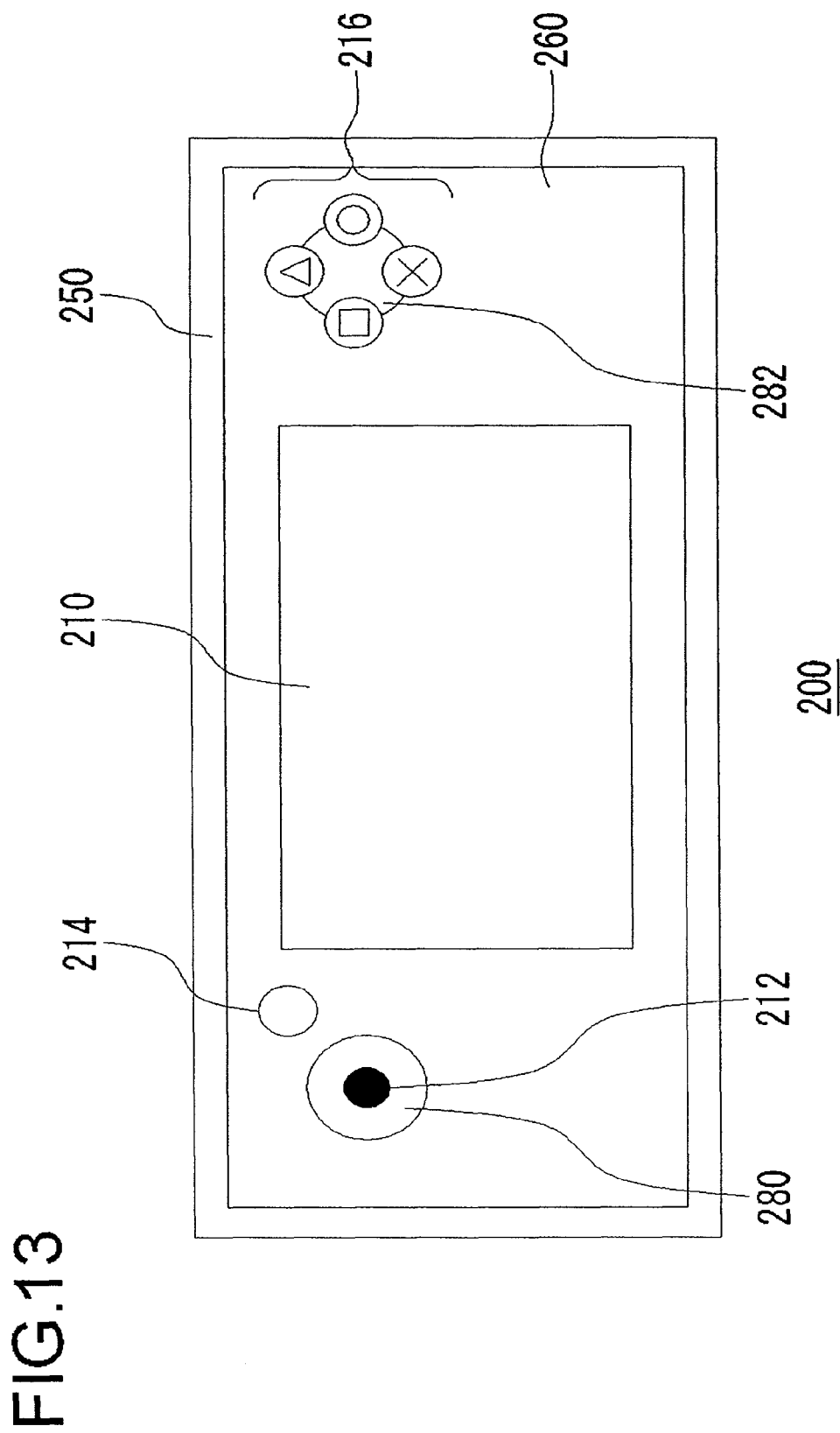
FIG. 13 is a front view of a portable information device according to second embodiment.

FIG. 13 shows a front view of a portable information device according to another embodiment of the invention. As shown, the portable information device 200 comprises a LCD 210, a small stick 212, an analog/digital selecting switch 214, main buttons 216, a center board 250, a front cover 260, a left recess 280, and a right recess 282.

The LCD 210 is positioned in central part of the portable information device 200 for displaying game images or movie contents. Display of LCD 210 is adjusted with predetermined luminance and color tone such that the user can view the displayed contents through the front cover 260 described later. The small stick 212 can be slanted for any direction of 360-degree, which realizes joystick function with its compact body. The slanted degree of the small stick 212 is acquired as input strength in analog manner. The analog/digital selecting switch 214 is a switch for the user to select analog or digital input from the small stick 212 in accordance with a need for the operation of a game or so. The main buttons 216 are buttons printed with circle, triangle, square and cross, respectively, each having a certain function. The main buttons 216 are disposed at a position of top, bottom, right and left part of a same circle, respectively. The small stick 212 and the main buttons 216 are used for operating a game character, for example.

The LCD 210 and built-in parts such as a CPU (not shown) are mounted on a center board 250. Outer rim of the center board 250 protrudes from the casing defined with the front cover 260 and a back cover 270 described later. Since the center board 250 is made of material having certain hardness such as metal, bending stiffness of the casing may be increased.

The front cover 260 is put on the front side of the center board 250 and covers built-in parts on the center board 150. The front cover 260 is made of material with predetermined transparency and a color, for example a resin such as polycarbonate. The front cover 260 is molded in a unified manner. With polycarbonate having a protection effect against ultraviolet rays, the center board 250 and the built-in parts may be protected against direct light or so when the portable information device is used in the open air. The front cover 260 made of such a resin has a predetermined color and transparency. Therefore, the user can view displayed contents on the LCD 210 with luminance adjusted described above through the front cover 260. Thus, no transparent window needs to be formed in the casing as a conventional portable information device. Therefore, since unity of the front cover is realized, the device may provide novelty impression to the user. The front cover 260 may be cast from metal such as aluminum. In this case, the shape of the front cover needs to be appropriately changed for ensuring the visibility of the LCD 210.

The portable information device 200 is gripped with both hands or one hand by the user. The shape of the portable information device 200 is configured such that a forefinger of the user is placed on a top face and a thumb of the user is placed on a front face.

On the front cover 260, substantially circular left recess 280 is provided with the small stick 212 as its center. Inside the circumference of the circle where circle, triangle, square and cross printed main buttons 216 are positioned, the right recess 282 is provided. Peripheral areas around the left recess 280 and the right recess 282 have predetermined size such that a user can hang the tip of his/her thumb on the fringe of the recess. Since the user can grip the casing with his/her thumb hanging on the left recess 280 and the right recess 282, the user can hold the portable information device stably and operate the device easily. In addition, even if the user takes his/her thumb off the joy stick when operating the small stick 212, the user can hang the thumb on the recess at once to hold the portable information device 200. So, the recess has an advantage to prevent falling of the device.

Further, since the main buttons 216 are arranged at the peripheral area around the right recess 282, the user's thumb for operating the main buttons is received in the recess naturally. Thus, the portable information device 200 is easily held with the thumb hanging the recess, increasing holding stability of the device.

The left recess 280 and the right recess 282 are arranged at symmetric position in the front face of the casing as shown. The user can grip the portable information device more naturally with the recesses. In addition, the front cover 260 has a gentle curve slanted to both right and left ends of the casing such that the whole casing comprises substantially spindle shape as shown. The left recess 280 and the right recess 282 are placed on a left slope and a right slope, respectively. With such arrangement, when the user's thumb is received in the recess, pushing power of the thumb directs to the center of the casing. Thus, the user can hold the portable information device 200 more stably.

Figure 14:
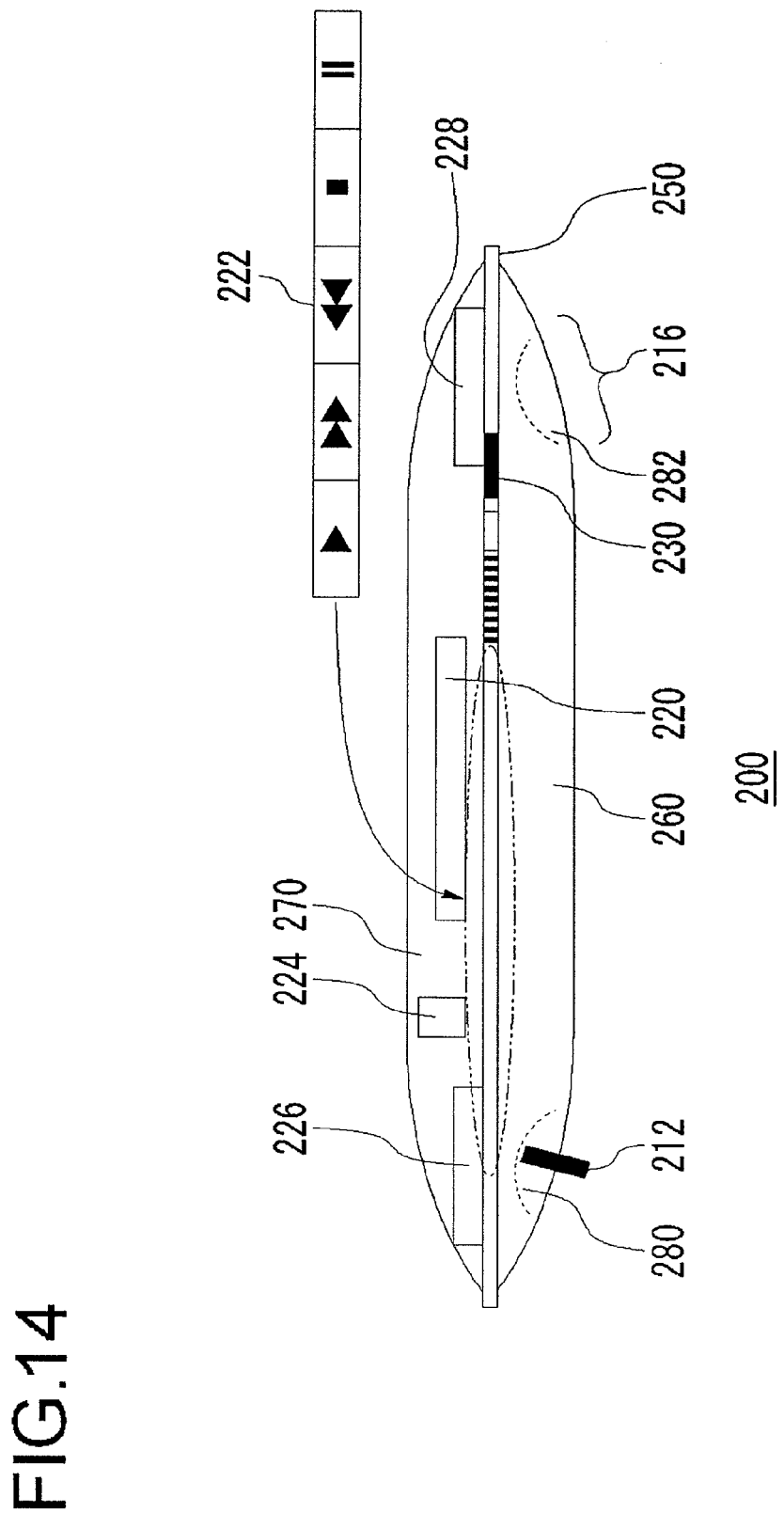
FIG. 14 is a top view of the portable information device according to second embodiment.

FIG. 14 is a top view of the portable information device 200 according to the second embodiment. As shown, the portable information device 200 further comprises a disk cartridge slot 220, group of media reproduction buttons 222, a small USB connector 224, a left shoulder switch 226, a right shoulder switch 228, an eject button 230, and a back cover 270.

Into the disk cartridge slot 220, a disk cartridge storing game software, movie contents, or music contents or so is inserted. The group of media reproduction buttons 222 is provided in a part surrounded in broken line in FIG. 14. The details of group of media reproduction buttons 222 are also shown in enlarged version for better understanding. The group of media reproduction buttons 222 is a group for controlling the reproduction of music contents or movie contents, which includes a play button, a fast-forwarding button, a fast-rewinding button, a stop button and a suspending button in a left-to-right fashion. The small USB connector 224 is a connector for connecting a personal computer or so to the portable information device 200, for example. Each of the left shoulder switch 226 and the right shoulder switch 228 is mainly operated by a forefinger of the user, which is used for operating a game character same as the small stick 212 and the main buttons 216 described with reference to FIG. 13. The eject button 230 is a button for ejecting a disk cartridge inserted into the disk cartridge slot 220.

The back cover 270 is put on the back side of the center board 250. The back cover 270 and the front cover 260 define the casing of the portable information device 200. The back cover 270 is also made of resin or metal same with the front cover 260. However, it is preferable that the back cover 270 is made of material having a certain frictional resistance. By employing material with raising fabric on its surface or with such finishing on its surface for example, friction is made between user's hand and the material. With such material, gripping feeling is increased. Such material functions as anti-slip when the portable information device 200 is gripped by hands, enabling stable holding. In another example, the back cover 270 may be made of leather or rubber, for example.

Figure 15:
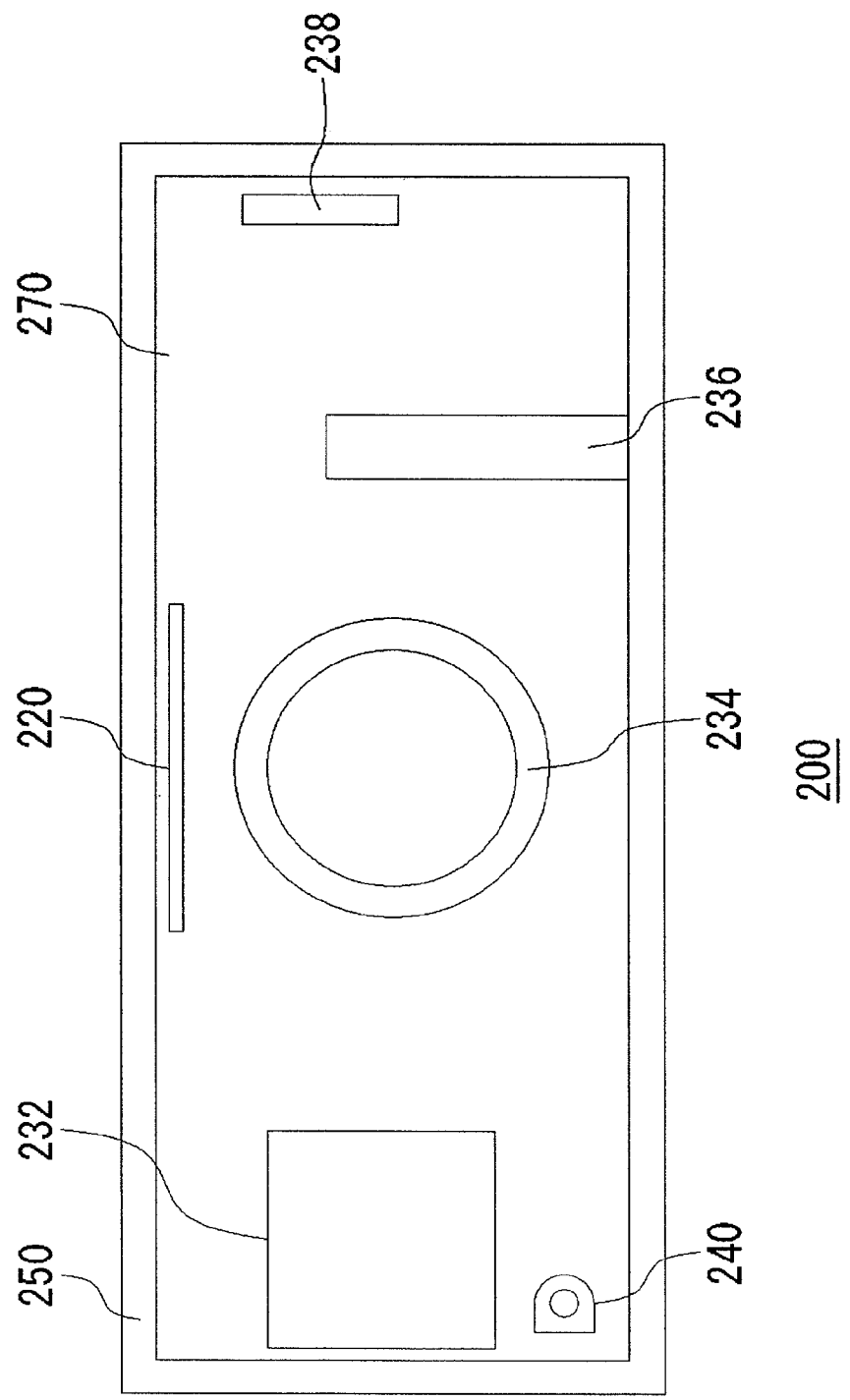
FIG. 15 is a rear view of the portable information device according to second embodiment.

FIG. 15 is a back view of the portable information device 200 according to the second embodiment. As shown, the portable information device 200 further comprises a battery 232, a transparent member 234, a stand 236, a memory slot 238, and an AC adapter jack insertion slot 240.

The battery 232 supplies power for drive the portable information device 200. The battery 232 is configured to be detachable from the portable information device 200. The user charges the battery by a battery charger (not shown). In another example, the battery 232 is fixed to the portable information device 200. In this case, the battery may be charged by the AC adapter (not shown) through the AC adapter jack insertion slot 240 described later. The transparent member 234 is provided such that the user can view the operating state of the disk cartridge by the user. Thus, the user can view the rotation of the disk cartridge loaded in the disk cartridge slot 220 described in FIG. 14. This also contributes to good design of the device. The stand 236 is a two-support-type member for standing the portable information device 200 on a table so that the user can view movie contents or so instead of holding the device 200 by hands. The memory slot 238 is an insertion slot for a recording medium storing contents such as game, movie or music. To the AC adapter jack insertion slot, a jack of the AC adapter (not shown) is inserted for directly acquiring power for driving the portable information device 200 without the battery 232 from home power supply, for example. As stated above, this AC adapter may be used to supply power to the battery 232.

Figure 16:
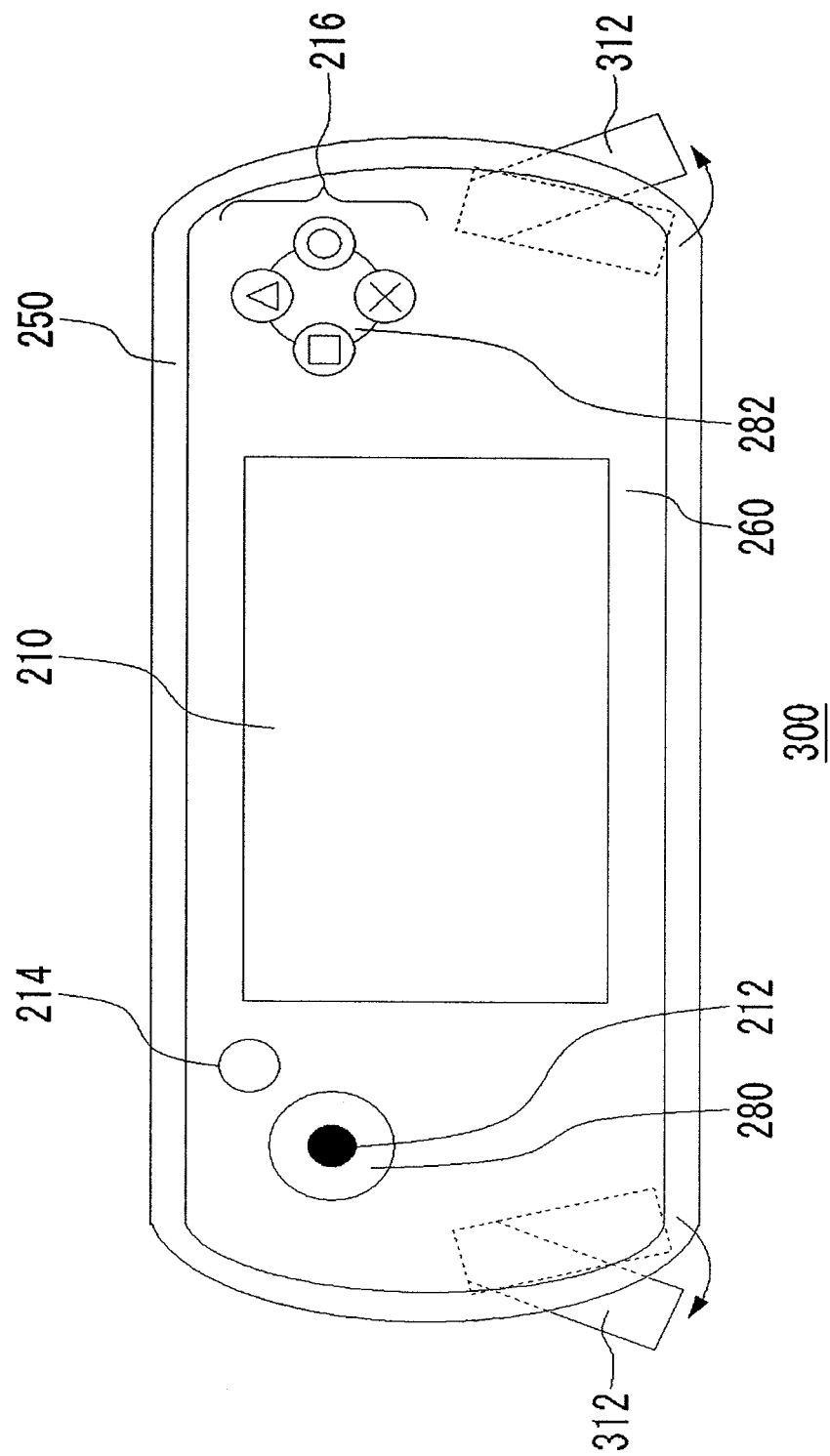
FIG. 16 is a front view of a first variation of the portable information device according to second embodiment.

FIG. 16 is a front view of a portable information device 300 according to a first variation of the second embodiment. Only a difference with FIG. 13 is described herein. In this variation, four corners of the casing and four corners of the center board 250 projecting from the casing have a round shape. With this, when the user operates the left shoulder switch 226 or the right shoulder switch 228 (not shown) by his/her forefinger, the casing fits comfortably in his/her hand and the user can operate the switches without discomfort. The shape of whole casing is designed roundly, so fresh impression can be provided. Furthermore, two-support-type gripping part 312 is housed in either side of the casing 10 of the portable information device 300. The user may pull out the gripping parts as needed and hold the portable information device 300 stably with them.

Figure 17:
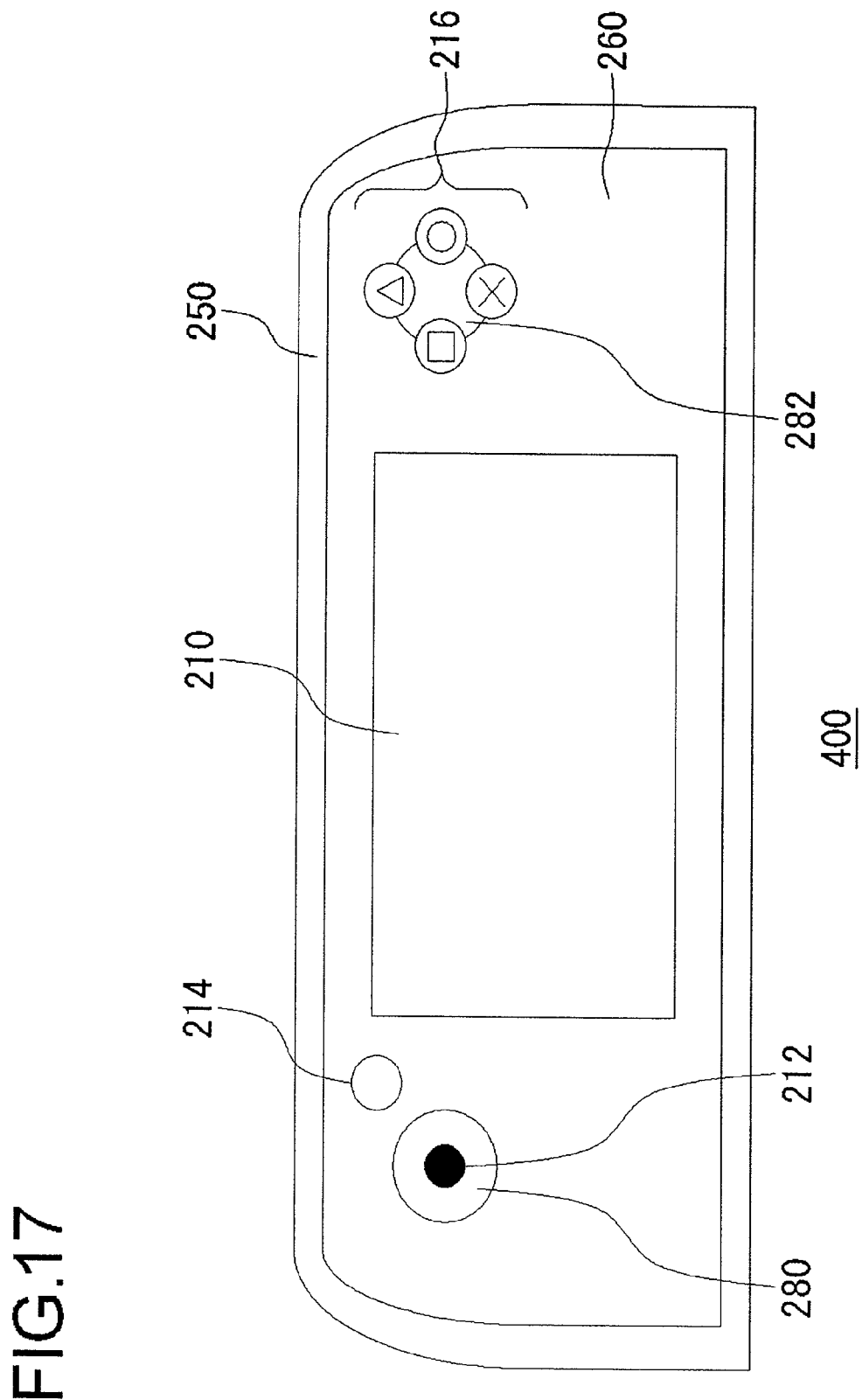
FIG. 17 is a front view of a second variation of the portable information device according to second embodiment.

FIG. 17 is a front view of a portable information device 400 according to a second variation of the second embodiment. Only a difference with FIG. 13 is described herein. In this variation, upper left corner and upper right corner of the casing and the center board 250 projecting from the casing have a round shape. Thus, there is same advantage with the first variation in regard to the operation of the left shoulder switch 226 and the right shoulder switch 228. In this variation, lower right corner and lower left corner of the casing and the center board 250 projecting from the casing are formed substantially right angle same with the portable information device 200 in FIG. 13. Hence, holding stability of the casing by the user is not decreased at these corners.

Figure 18:
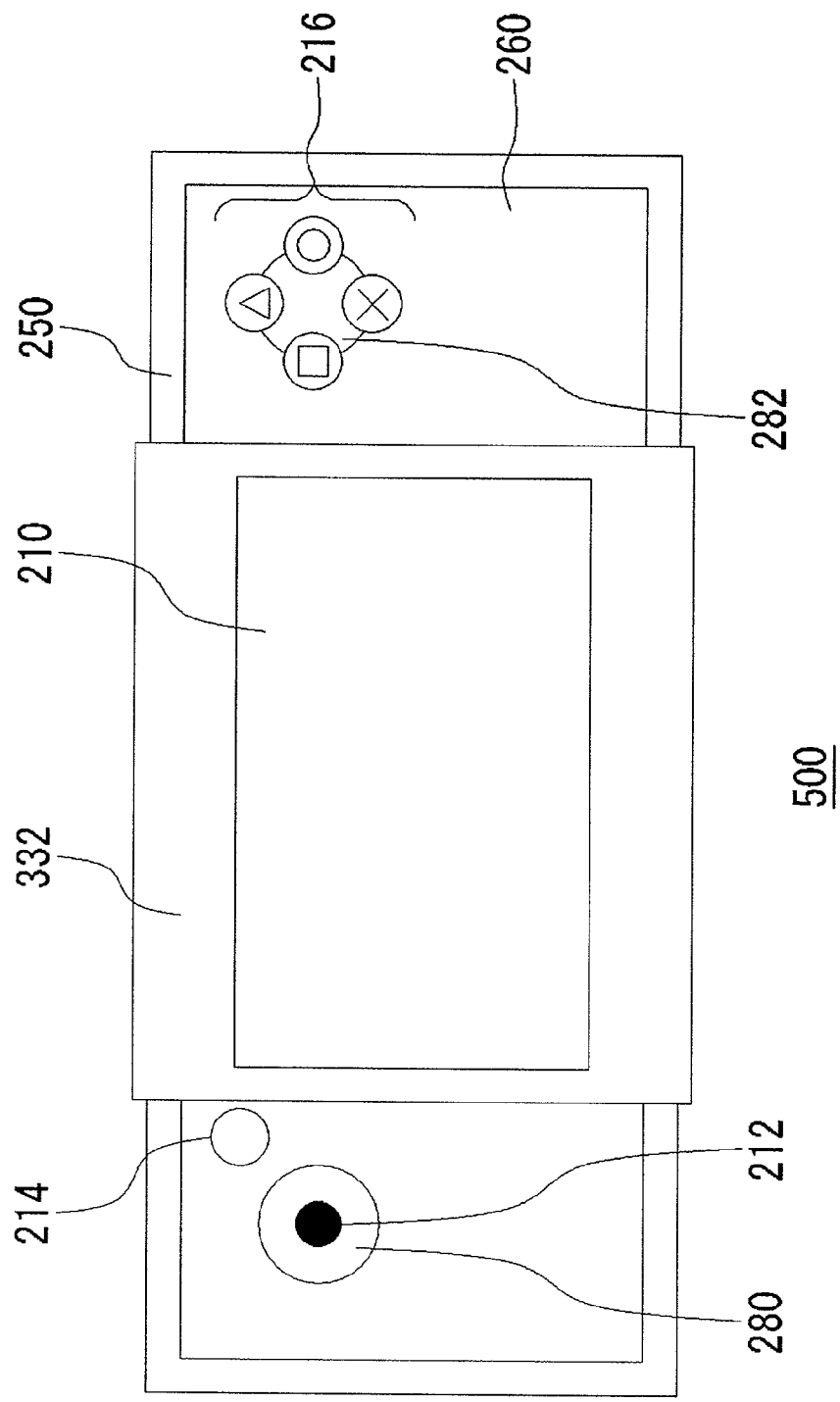
FIG. 18 is a front view of a third variation of the portable information device according to second embodiment.
Figure 19:
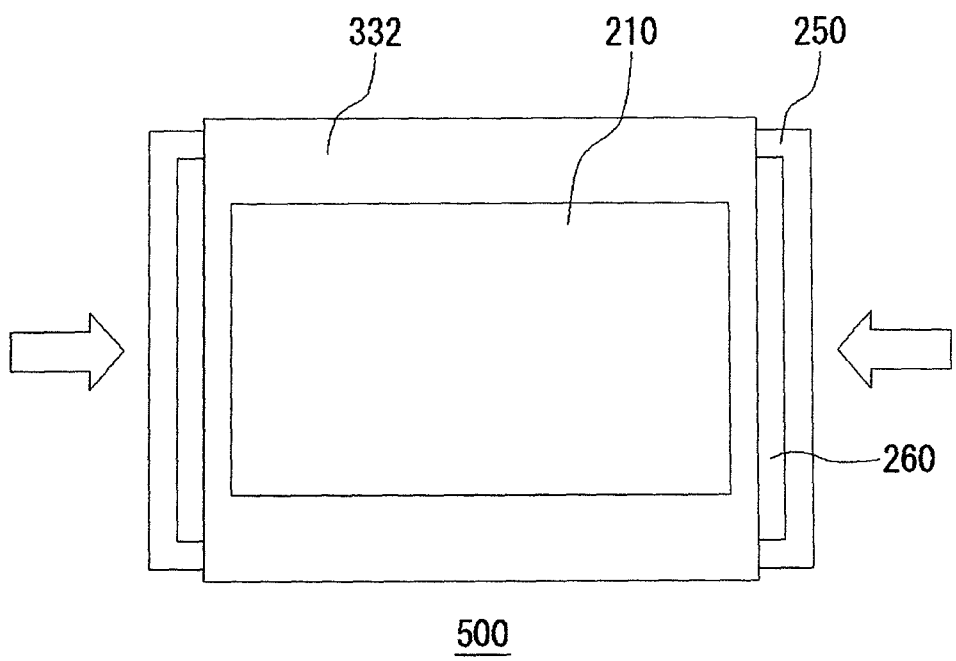
FIG. 19 is a front view showing the working of the portable information device in FIG. 18.

FIG. 18 is a front view of a portable information device 500 according to a third variation of the second embodiment. Only a difference with FIG. 13 is described herein. This portable information device 500 comprises container part 332. The casing and the central board 250 comprises sliding mechanism (not shown). As shown in FIG. 19, left wing and right wing of the casing and the central board 250 may slide to be accommodated into the container part 332. By this mechanism, the portable information device may change its size to small one for carriage, increasing its portability. In addition, since all the operation mechanism such as the small stick 212, the analog/digital selecting switch 214, the main buttons 216 are housed into the container part 332, false operation may be prevented during carriage.

The present invention has been described based on some embodiments. Such description is for illustrative purposes only. Thus, those skilled in the art would understand that various variations may be made in combinations with the components and such variations are within the scope of the present invention. An arbitrary combination of the components described in the embodiments is also effective as an embodiment of the present invention.

While the portable electric device or the portable information device have been described in the embodiment, the structure or the arrangement of the buttons according to the invention may be also applicable to a controller for a stay-at-home type game machine.

INDUSTRIAL APPLICABILITY

According to the present invention, the operability of a portable electronic device may be improved.

The invention claimed is:

1. A portable electronic device, comprising:
a casing, both ends of which are capable of being gripped by a user's both hands, respectively;
a display unit fitted onto the face of the casing;
an operation device arranged to operate an object in the image displayed on the display unit;
a left-hand area and a right-hand area on which the operation device is located, respectively; and
a home button located in an area sandwiched between the left-hand area and the right-hand area, the home button being arranged to put the image displayed on the display unit back to a main screen,
wherein the home button is located below the display unit, and
wherein the operation device comprises an analog operation device operated by a thumb of the user gripping the casing, the analog operation device being arranged to output an analog signal for direction of the object.

2. The portable electronic device of claim 1, wherein the home button is located within an area constituted to be tactilely or visually distinct from the left-hand area and the right-hand area.

3. The portable electronic device of claim 1, wherein the operation device comprises a direction instruction key operated by a thumb of the user gripping the casing, the direction instruction key having a plurality of pressing faces each corresponding to an operation direction thereon.

4. The portable electronic device of claim 3, wherein the center of the analog operation device is located inwardly than the center of the direction instruction key.

5. The portable electronic device of claim 1, wherein the operation device comprises a plurality of button keys operated by a thumb of the user gripping the casing, the plurality of button keys each outputting single instruction.

* * * * *